US012652584B2

(12) United States Patent
Agiwal et al.

(10) Patent No.: US 12,652,584 B2
(45) Date of Patent: Jun. 9, 2026

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 18/064,179

(22) Filed: Dec. 9, 2022

(65) Prior Publication Data

US 2023/0105318 A1      Apr. 6, 2023

Related U.S. Application Data

(63) Continuation of application No. 17/247,994, filed on Jan. 4, 2021, now abandoned.

(60) Provisional application No. 62/957,763, filed on Jan. 6, 2020.

(51) Int. Cl.
| | |
|---|---|
| *H04W 36/00* | (2009.01) |
| *H04W 36/24* | (2009.01) |
| *H04W 72/23* | (2023.01) |

(52) U.S. Cl.
CPC ..... *H04W 36/0055* (2013.01); *H04W 36/249* (2023.05); *H04W 72/23* (2023.01)

(58) Field of Classification Search
None
See application file for complete search history.

(56) References Cited

U.S. PATENT DOCUMENTS

| | | | | |
|---|---|---|---|---|
| 12,120,767 | B2 * | 10/2024 | Futaki | H04W 72/51 |
| 2015/0092554 | A1 * | 4/2015 | Mochizuki | H04W 76/27 |
| | | | | 370/252 |
| 2015/0208450 | A1 * | 7/2015 | Mademann | H04L 65/1104 |
| | | | | 370/329 |
| 2016/0142948 | A1 | 5/2016 | Bergstrom et al. | |
| 2017/0366920 | A1 | 12/2017 | Agiwal | |
| 2018/0049225 | A1 | 2/2018 | Lee et al. | |
| 2018/0070282 | A1 * | 3/2018 | Su | H04W 72/12 |
| 2019/0089498 | A1 | 3/2019 | Pelletier et al. | |

(Continued)

FOREIGN PATENT DOCUMENTS

| | | |
|---|---|---|
| CN | 110649988 A | 1/2020 |
| EP | 4013120 A1 | 6/2022 |

OTHER PUBLICATIONS

Ahmed, "IOT Device Security for 5G Network," The City College of New York, 2018, 135 pages.

(Continued)

*Primary Examiner* — Clemence S Han

(57) ABSTRACT

A method and apparatus in a wireless communication system are provided. The method performed by a terminal may include: receiving, from a source node, a handover command comprising mode information associated with one or more scheduling modes in a target node; based on the handover command, determining, among the one or more scheduling modes, a scheduling mode associated with one or more sidelink logical channels (SL LCHs); and transmitting, to the target node, data from the one or more SL LCHs, based on the determined scheduling mode.

15 Claims, 10 Drawing Sheets

(56) References Cited

U.S. PATENT DOCUMENTS

| | | | |
|---|---|---|---|
| 2019/0132830 A1* | 5/2019 | Tabet .................... | H04W 72/21 |
| 2019/0159168 A1* | 5/2019 | Wang .................... | H04W 68/02 |
| 2020/0022019 A1* | 1/2020 | Xu .................... | H04W 28/0278 |
| 2020/0205209 A1 | 6/2020 | Pan et al. | |
| 2020/0267729 A1 | 8/2020 | Kim et al. | |
| 2020/0314913 A1* | 10/2020 | Rastegardoost .. | H04W 36/0064 |
| 2021/0160791 A1* | 5/2021 | Sha .................... | H04W 52/365 |
| 2021/0219349 A1* | 7/2021 | Huang ............. | H04W 74/0836 |
| 2021/0258853 A1 | 8/2021 | Wang et al. | |
| 2022/0015070 A1 | 1/2022 | Chen et al. | |
| 2022/0022228 A1 | 1/2022 | Wang et al. | |
| 2022/0094495 A1* | 3/2022 | Wang .................... | H04L 5/0064 |
| 2022/0217790 A1* | 7/2022 | Qiu .................... | H04W 74/0833 |
| 2022/0264638 A1* | 8/2022 | Qiu .................... | H04W 74/085 |
| 2023/0013851 A1* | 1/2023 | Lin ........................ | H04W 72/23 |
| 2023/0030443 A1* | 2/2023 | Chen .................... | H04W 72/23 |

OTHER PUBLICATIONS

International Search Report and Written Opinion of the International Searching Authority dated Apr. 8, 2021 in connection with International Application No. PCT/KR2021/000008, 9 pages.

Apple, "UE Mobility for Simultaneous Mode 1 & Mode 2 configuration," R2-1915777 (Rev of R2-1913498), 3GPP TSG-RAN WG2 Meeting #108, Reno, USA, Nov. 18-22, 2019, 3 pages.

Huawei et al., "Discussion on mobility enhancement for mode-1," R2-1911088 (Revision of R2-1907448), 3GPP TSG-RAN WG2 Meeting #107, Prague, Czech Republic, Aug. 26-30, 2019, 3 pages.

Intel Corporation, "Remaining issues on sidelink configured grant design," R2-1914851, 3GPP TSG-RAN WG2 Meeting #108, Reno, USA, Nov. 18-22, 2019, 5 pages.

ITL, "Details and further considerations of simultaneous configuration of mode 1 and 2," R2-1916025, 3GPP TSG RAN WG2 Meeting #108, Reno, USA, Nov. 18-22, 2019, 2 pages.

Notification of the First Office Action issued Jan. 26, 2025, in connection with Chinese Patent Application No. 202180007626.3, 11 pages.

* cited by examiner

701 M2 SL LCHs

703 M1 SL LCHs not mapped to CG Type 1

705 M1 SL LCHs mapped to CG Type 1

METHOD AND APPARATUS FOR PERFORMING COMMUNICATION IN WIRELESS COMMUNICATION SYSTEM

CROSS-REFERENCE TO RELATED APPLICATION

This application is a continuation of application Ser. No. 17/247,994, filed Jan. 4, 2021, which is based on and claims priority under 35 U.S.C. § 119(e) of a U.S. Provisional application No. 62/957,763, filed on Jan. 6, 2020, in the United States Patent and Trademark Office, the disclosures of which are incorporated by reference herein in their entirety.

BACKGROUND

1. Field

The disclosure relates to wireless communication systems, and more particularly, to method and apparatus for handling a scheduling mode during handover and performing an early data transmission in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments of the disclosure.

In accordance with an aspect of the disclosure, a method performed by a terminal in a wireless communication system is disclosed. The method may comprise: receiving, from a source node, a handover command comprising mode information associated with one or more scheduling modes in a target node; based on the handover command, determining, among the one or more scheduling modes, a scheduling mode associated with one or more sidelink logical channels (SL LCHs); and transmitting, to the target node, data from the one or more SL LCHs, based on the determined scheduling mode.

In an embodiment, wherein the handover command further comprises: exceptional resource pool information for identifying a configuration of an exceptional resource pool; and configured grant (CG) type information associated with a configuration of a CG Type 1 SL grant for the one or more SL LCHs, wherein the one or more scheduling modes comprises: a first scheduling mode associated with a scheduled resource allocation; and a second scheduling mode associated with an autonomous resource allocation.

In an embodiment, wherein the determining of the scheduling mode comprises: in case that a first SL LCH is associated with the CG Type 1 SL grant, determining a scheduling mode of the first SL LCH as the first scheduling mode.

In an embodiment, wherein transmitting of the data from the one or more SL LCHs comprises: transmitting, to the target node, first data from the first SL LCH based on the first scheduling mode and the CG Type 1 SL grant, until a handover is completed.

In an embodiment, wherein the determining of the scheduling mode comprises: in case that a second SL LCH is associated with the first scheduling mode, the second SL LCH is unmapped to the CG Type 1 SL grant and the exceptional resource pool is configured, determining a scheduling mode of the second SL LCH as the second scheduling mode.

In an embodiment, wherein transmitting of the data from the one or more SL LCHs comprises: transmitting, to the target node, second data from the second SL LCH based on the second scheduling mode and the exceptional resource pool, until a handover is completed.

In an embodiment, wherein the determining of the scheduling mode comprises: in case that a third SL LCH is associated with the first scheduling mode, the third SL LCH is unmapped to the CG Type 1 SL grant and the exceptional resource pool is not configured, determining a scheduling mode of the third SL LCH as the first scheduling mode.

In an embodiment, wherein transmitting of the data from the one or more SL LCHs comprises: transmitting, to the target node, third data from the third SL LCH based on the first scheduling mode and the CG Type 1 SL grant, until a handover is completed.

In an embodiment, wherein the determining of the scheduling mode comprises: in case that a fourth SL LCH is associated with the second scheduling mode and the exceptional resource pool is configured, determining a scheduling mode of the fourth SL LCH as the second scheduling mode; and in case that a fifth SL LCH is associated with the second scheduling mode and the exceptional resource pool is not configured, determining a scheduling mode of the fifth SL LCH as the first scheduling mode.

In an embodiment, wherein transmitting of the data from the one or more SL LCHs comprises: transmitting, to the target node, fourth data from the fourth SL LCH based on the second scheduling mode and the exceptional resource pool, until sensing results are available; and transmitting, to the target node, fifth data from the fifth SL LCH based on the first scheduling mode and the CG Type 1 SL grant, until the sensing results are available.

In accordance with an aspect of the disclosure, a terminal in a wireless communication system is disclosed. The terminal may comprise: a transceiver; and at least one processor configured to: receive, from a source node via the transceiver, a handover command comprising mode information associated with one or more scheduling modes in a target node; based on the handover command, determine, among the one or more scheduling modes, a scheduling mode associated with one or more sidelink logical channels (SL LCHs); and transmit, to the target node via the transceiver, data from the one or more SL LCHs, based on the determined scheduling mode.

In an embodiment, wherein the handover command further comprises: exceptional resource pool information for identifying a configuration of an exceptional resource pool; and configured grant (CG) type information associated with a configuration of a CG Type 1 SL grant for the one or more SL LCHs, wherein the one or more scheduling modes comprises: a first scheduling mode associated with a scheduled resource allocation; and a second scheduling mode associated with an autonomous resource allocation.

In an embodiment, wherein the at least one processor is further configured to: in case that a first SL LCH is associated with the CG Type 1 SL grant, determine a scheduling mode of the first SL LCH as the first scheduling mode.

In an embodiment, wherein the at least one processor is further configured to: transmit, to the target node via the transceiver, first data from the first SL LCH based on the first scheduling mode and the CG Type 1 SL grant, until a handover is completed.

In an embodiment, wherein the at least one processor is further configured to: in case that a second SL LCH is associated with the first scheduling mode, the second SL LCH is unmapped to the CG Type 1 SL grant and the exceptional resource pool is configured, determine a scheduling mode of the second SL LCH as the second scheduling mode.

In an embodiment, wherein the at least one processor is further configured to: transmit, to the target node via the transceiver, second data from the second SL LCH based on the second scheduling mode and the exceptional resource pool, until a handover is completed.

In an embodiment, wherein the at least one processor is further configured to: in case that a third SL LCH is associated with the first scheduling mode, the third SL LCH is unmapped to the CG Type 1 SL grant and the exceptional resource pool is not configured, determine a scheduling mode of the third SL LCH as the first scheduling mode.

In an embodiment, wherein the at least one processor is further configured to: transmit, to the target node via the transceiver, third data from the third SL LCH based on the first scheduling mode and the CG Type 1 SL grant, until a handover is completed.

In an embodiment, wherein the at least one processor is further configured to: in case that a fourth SL LCH is associated with the second scheduling mode and the exceptional resource pool is configured, determine a scheduling mode of the fourth SL LCH as the second scheduling mode; and in case that a fifth SL LCH is associated with the second scheduling mode and the exceptional resource pool is not configured, determine a scheduling mode of the fifth SL LCH as the first scheduling mode.

In an embodiment, wherein the at least one processor is further configured to: transmit, to the target node via the transceiver, fourth data from the fourth SL LCH based on the second scheduling mode and the exceptional resource pool, until sensing results are available; and transmit, to the target node via the transceiver, fifth data from the fifth SL LCH based on the first scheduling mode and the CG Type 1 SL grant, until the sensing results are available.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a flow chart illustrating a method of performing EDT;

FIG. 2 is a flow chart illustrating another method of performing EDT;

Throughout the drawings, it should be noted that like reference numbers are used to depict the same or similar elements, features, and structures.

DETAILED DESCRIPTION

Figure 1:
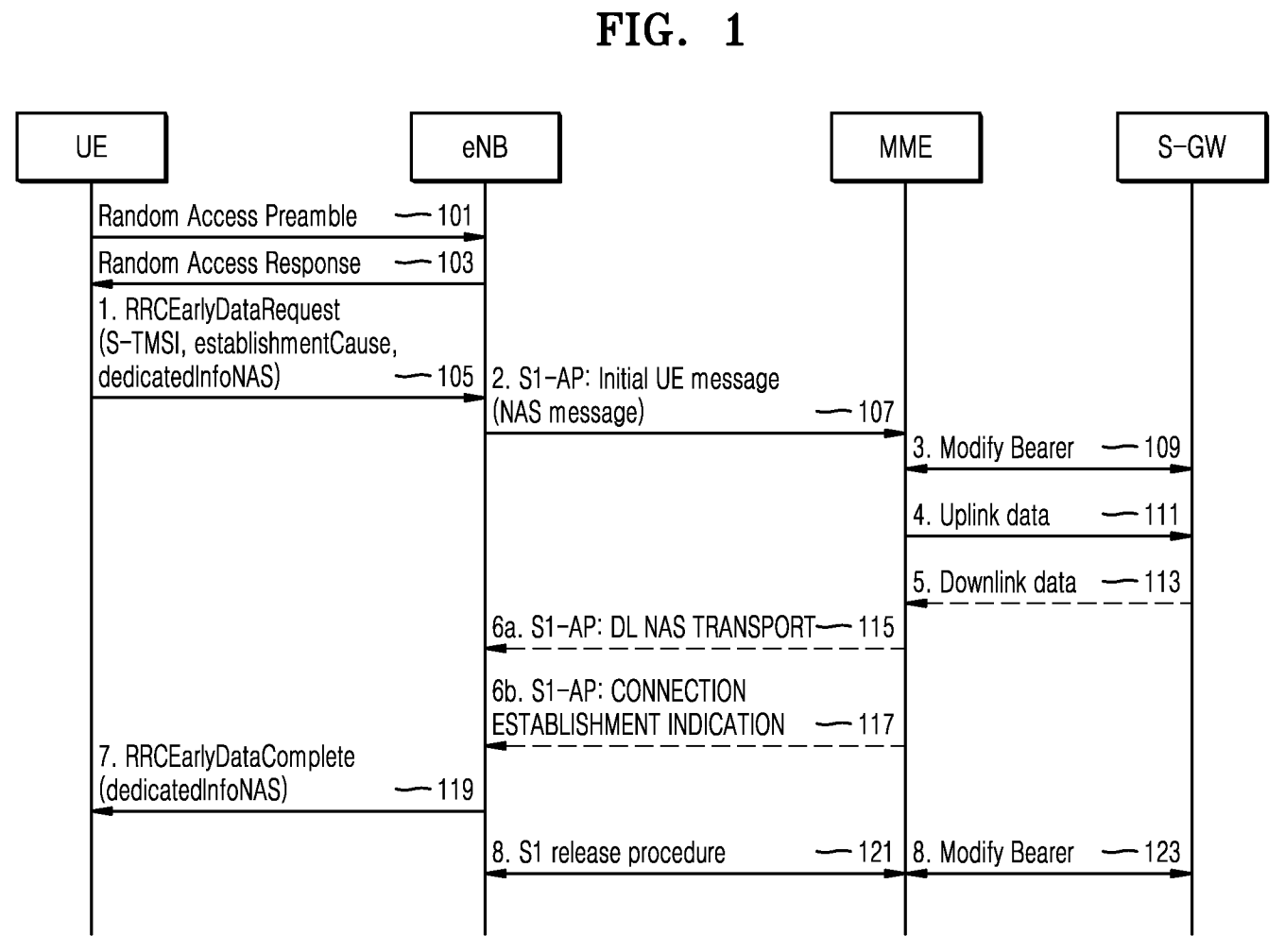
Figure 3:
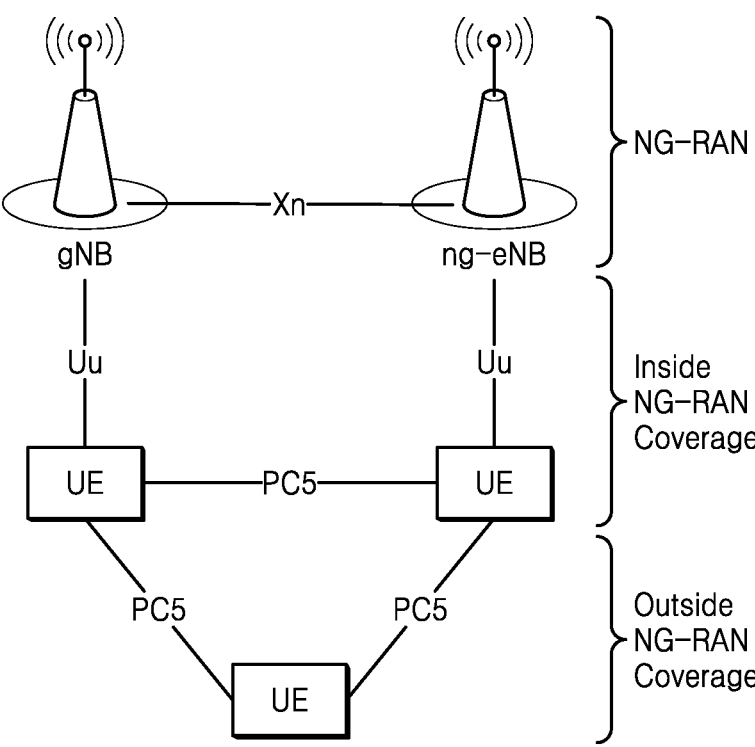
FIG. 3 is a diagram illustrating NG-architecture supporting PC5 interface.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. Therefore, 5G communication system (also referred as next generation radio or NR) is being developed to meet the growing demand for high speed data services, support ultra-reliability and low latency applications.

The 5G communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of 5G communication system. In addition, the 5G communication system is expected to address different use cases having quite different requirements in terms of data rate, latency, reliability, mobility etc. However, it is expected that the design of the air-interface of the 5G communication system would be flexible enough to serve the UEs having quite different capabilities depending on the use case and market segment of the UE cater service to the end customer. For example, use cases that the 5G communication system is expected to address are enhanced Mobile Broadband (eMBB), massive Machine Type Communication (m-MTC), ultra-reliable low latency communication (URLL), etc. The eMBB requirements like tens of Gbps data rate, low latency, high mobility and so on, address the market segment representing the conventional wireless broadband subscribers who need internet connectivity everywhere, all the time and on the go. The m-MTC requirements like very high connection density, infrequent data transmission, very long battery life, low mobility and so forth, address the market segment, which represents the Internet of Things (IoT)/Internet of Everything (IoE) envisioning connectivity of billions of devices. The URLL requirements like very low latency, very high reliability and variable mobility and so forth, address the market segment, which represents the Industrial automation application and vehicle-to-vehicle/vehicle-to-infrastructure communication foreseen as one of the enablers for autonomous cars.

In the 5G wireless communication system operating in higher frequency (mmWave) bands, UE and gNB communicate with each other using the Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred to as transmit (TX) beam. Wireless communication system operating at high frequency uses a plurality of narrow TX beams to transmit signals in the cell as each narrow TX beam provides coverage to a part of cell. The narrower the TX beam, the higher the antenna gain is and hence the larger the propagation distance of signal transmitted using beamforming is. A receiver can also make plurality of receive (RX) beam patterns of different directions. Each of these receive patterns can be also referred to as receive (RX) beam.

The 5G communication system, supports standalone mode of operation as well as dual connectivity (DC). In DC, a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control (RRC)_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with carrier aggregation (CA)/DC, there is only one serving cell comprising the primary cell. For a UE in RRC_CONNECTED configured with CA/DC, the term 'serving cells' is used to denote the set of cells comprising the Special Cell(s) and all secondary cells. In NR, the term Master Cell Group (MCG) refers to a group of serving cells associated with the Master Node, comprising the PCell and optionally one or more SCells. In NR, the term Secondary Cell Group (SCG) refers to a group of serving cells associated with the Secondary Node, comprising the PSCell and optionally one or more SCells.

In NR, PCell (primary cell) refers to a serving cell in MCG, operating on the primary frequency, in which the UE either performs the initial connection establishment procedure or initiates the connection re-establishment procedure. In NR, for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the 5G communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid-automatic repeat request (ARQ) information related to DL-SCH; Uplink scheduling grants containing at least modulation and coding format, resource allocation, and hybrid-ARQ information related to UL-SCH.

In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block (PRB)(s) and orthogonal frequency division multiplexing (OFDM) symbol(s) where the UE may assume that no transmission is intended for the UE; Transmission of transmission power control (TPC) commands for PUCCH and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In 5G communication system, a list of search space configurations is signaled by gNB for each configured bandwidth part (BWP) wherein each search configuration is uniquely identified by an identifier. Identifier of search space configuration to be used for specific purpose such as paging reception, system information (SI) reception, random access response reception is explicitly signaled by gNB. In NR search space configuration comprises parameters such as Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters such as PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot})\mod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the coreset associated with the search space. Search space configuration includes the identifier of coreset configuration associated with the search space. A list of coreset configurations is signaled by gNB for each configured BWP, wherein each coreset configuration is uniquely identified by an identifier. Note that each radio frame is of 10 ms duration. Radio frame is identified by a radio frame number or system frame number. Each radio frame comprises several slots, wherein the number of slots in a radio frame and duration of slots depends on sub carrier spacing (SCS). The number of slots in a radio frame and duration of slots that depend on radio frame for each supported SCS, is pre-defined in NR. Each coreset configuration is associated with a list of TCI (Transmission configuration indicator) states. One DL RS ID, such as synchronization signal block (SSB) or channel state information reference signal (CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi collocated (QCLed) with SSB/CSI RS of TCI state) used by gNB for transmission of PDCCH in the PDCCH monitoring occasions of a search space.

In 5G communication system, bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected UE with BWP(s) and telling the UE which of the configured BWPs is currently the active one.

When BA is configured, the UE only has to monitor PDCCH on the one active BWP, i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure.

Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure are supported.

Contention based random access (CBRA): This is also referred to as 4 step CBRA. In this type of random access, UE first transmits Random Access preamble (also referred as Msg1) and then waits for Random access response (RAR) in the RAR window. RAR is also referred to as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB.

The RA-RNTI is calculated as follows: RA-RNTI=1+ s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step, i.e., select random access resource (preamble/RACH occasion) and transmits the RA preamble. A backoff may be applied before going back to first step.

If the RAR corresponding to its RA preamble transmission is received, the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed.

While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step, i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns, to UE, dedicated Random access preamble. UE transmits the dedicated RA preamble. eNB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case that RA is initiated for beam failure recovery, CFRA is considered to be successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access, i.e., during random access resource selection for Msg1 transmission UE determines whether to transmit dedicated preamble or non-dedicated preamble. Dedicated preambles are typically provided for a subset of SSBs/CSI RSs. If there is no SSB/CSI RS having DL reference signal received power (RSRP) above a threshold amongst the SSBs/CSI RSs for which contention free random access resources (i.e., dedicated preambles/ROs) are provided by gNB, UE selects non dedicated preamble. Otherwise, UE selects dedicated preamble. So, during the RA procedure, one random access attempt can be CFRA while other random access attempt can be CBRA.

2 step contention based random access (2 step CBRA): In the first step, UE transmits random access preamble on PRACH and a payload (i.e., MAC PDU) on PUSCH. The random access preamble and payload transmission is also referred to as MsgA. In the second step, after MsgA transmission, the UE monitors for a response from the network (i.e., gNB) within a configured window. The response is also referred to as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered to be successfully completed.

Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered to be successfully completed. If contention resolution fails upon fallback (i.e., upon transmitting Msg3), UE retransmits MsgA. If configured window in which UE monitors network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure, i.e., UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU.

The UE ID can be one of random ID, S-TMSI, C-RNTI, resume ID, international mobile subscriber identifier (IMSI), idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case that UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP(Tx/Rx point) switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If UE receives PDCCH addressed to C-RNTI, random access procedure is considered to be successfully completed. If UE receives fallback information corresponding to its transmitted preamble, random access procedure is considered to be successfully completed.

For certain events such as handover and beam failure recovery, if dedicated preamble(s) and PUSCH resource(s) are assigned to UE, during first step of random access, i.e., during random access resource selection for MsgA transmission, UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by gNB, UE selects non-dedicated preamble. Otherwise, UE selects dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE selects the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE selects the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise, UE selects 2 step RACH.

In the 5G communication system, node B (gNB) or base station in cell broadcast Synchronization Signal and PBCH block (SSB) consists of primary and secondary synchronization signals (PSS, SSS) and system information. System information includes common parameters needed to communicate in cell. In the 5G communication system (also referred as next generation radio or NR), System Information (SI) is divided into the MIB and a number of SIBs where: the MIB is always transmitted on the broadcast channel (BCH) with a periodicity of 80 milliseconds (ms) and repetitions made within 80 ms and it includes parameters that are needed to acquire SIB1 from the cell.

The SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB1 includes mapping between SIBs and SI messages, periodicity of each SI message and SI window length. The scheduling information in SIB1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID.

UE acquires SIB1 from the camped or serving cell. UE checks the BroadcastStatus bit in SIB1 for SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If SI message which UE needs to acquire is not being broadcasted (i.e., BroadcastStatus bit is set to zero), UE initiates transmission of SI request. The procedure for SI request transmission is as follows.

If SI request configuration is signaled by gNB for SUL, and criteria to select SUL is met (i.e., RSRP derived from SSB measurements of camped or serving cell<rsrp-ThresholdSSB-SUL, where rsrp-ThresholdSSB-SUL is signaled by gNB (e.g., in broadcast signaling such as SIB1)): UE initiates transmission of SI request based on Msg1 based SI request on SUL. In other words, UE initiates Random Access procedure using the PRACH preamble(s) and PRACH resource(s) in SI request configuration of SUL. UE transmits Msg1 (i.e., Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): UE initiates transmission of SI request based on Msg1 based SI request on NUL. In other words, UE initiates Random Access procedure using the PRACH preamble(s) and PRACH resource(s) in SI request configuration of NUL. UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiates transmission of SI request based on Msg3 based SI request. In other words, UE initiates transmission of RRCSystemInfoRequest message. UE transmits Msg1 (i.e., Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e., RRCSystemInfoRequest message). If acknowledgement for SI request (i.e., RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell is less than rsrp-ThresholdSSB-SUL, where rsrp-ThresholdSSB-SUL is signaled by gNB (e.g., in broadcast signaling such as SIB1). NUL is the selected UL carrier, if RSRP derived from SSB measurements of camped or serving cell is greater than or equal to rsrp-ThresholdSSB-SUL, where rsrp-ThresholdSSB-SUL is signaled by gNB (e.g., in broadcast signaling such as SIB1).

4G wireless communication system supports early data transmission (EDT). EDT allows one uplink data transmission optionally followed by one downlink data transmission during the random access procedure. EDT is triggered when the upper layers have requested the establishment or resumption of the RRC Connection for Mobile Originated data (i.e., not signaling or short message service (SMS)) and the uplink data size is less than or equal to a TB size indicated in the system information.

In one approach of EDT, uplink user data are transmitted in a NAS message concatenated in UL RRCEarlyDataRequest message on CCCH. Downlink user data are optionally transmitted in a NAS message concatenated in DL RRCEarlyDataComplete message on CCCH. There is no transition to RRC_CONNECTED. The detailed procedure (see FIG. 1) is as follows.

FIG. 1 is a flow chart illustrating a method of performing EDT.

Upon connection establishment request for Mobile Originated data from the upper layers, the UE initiates the early data transmission procedure and selects a random access preamble configured for EDT.

In step 101, the UE may transmit the random access preamble configured for the EDT to the eNB.

In step 103, the UE may receive random access response from the eNB in response to the transmitted random access preamble. 1erforming EDT according to an embodiment of the disclosure.

In step 105, the UE may transmit, to the eNB, a request message associated with the EDT. For example, the UE may transmit, to the eNB, RRCEarlyDataRequest message concatenating the user data on CCCH. The RRCEarlyDataRequest message may comprise S-TMSI, an establishment cause and dedicatedInfoNAS.

In step 107, the eNB may transmit, to a mobility management entity (MME), an initial UE message associated with a S1-application protocol (AP) to forward the NAS message and establish the S1 connection. The eNB may indicate in the initial UE message that the S1 connection is triggered for the EDT.

In step 109, the MME may request the serving-gateway (S-GW) to re-activate the evolved packet system (EPS) bearers for the UE.

In step 111, the MME may transmit uplink data to the S-GW.

In step 113, if downlink data are available, the S-GW may transmit the downlink data to the MME.

In step 115, if the downlink data are received from the S-GW, the MME may forward the downlink data to the eNB via DL NAS Transport procedure and may also indicate whether further data are expected.

In step 117, if the downlink data are not received from the S-GW, the MME may trigger Connection Establishment Indication procedure and also indicate whether further data are expected.

In step 119, if no further data are expected, the eNB may transmit a RRCEarlyDataComplete message on CCCH to keep the UE in RRC_IDLE. If the downlink data were received in step 115, the downlink data are concatenated in the RRCEarlyDataComplete message. The RRCEarlyDataComplete message may comprise dedicatedInfoNas.

In step 121, the S1 connection is released.

In step 123, the EPS bearers are deactivated.

If the MME or the eNB decides to move the UE in RRC_CONNECTED mode, RRCConnectionSetup message is sent in step 119 to fall back to the legacy RRC Connection establishment procedure; the eNB will discard the zero-length NAS PDU received in msg5.

In another approach of the EDT, the UE has been provided with a NextHopChainingCount in the RRCConnectionRelease message with suspend indication. Uplink user data are transmitted on DTCH multiplexed with UL RRCConnectionResumeRequest message on CCCH. Downlink user data are optionally transmitted on DTCH multiplexed with DL RRCConnectionRelease message on DCCH. The short resume MAC-I is reused as the authentication token for RRCConnectionResumeRequest message and is calculated using the integrity key from the previous connection. The user data in uplink and downlink are ciphered. The keys are derived using the NextHopChainingCount provided in the RRCConnectionRelease message of the previous RRC connection. The RRCConnectionRelease message is integrity protected and ciphered using the newly derived keys. There is no transition to RRC CONNECTED. The detailed procedure (see FIG. 2) is as follows.

Figure 2:
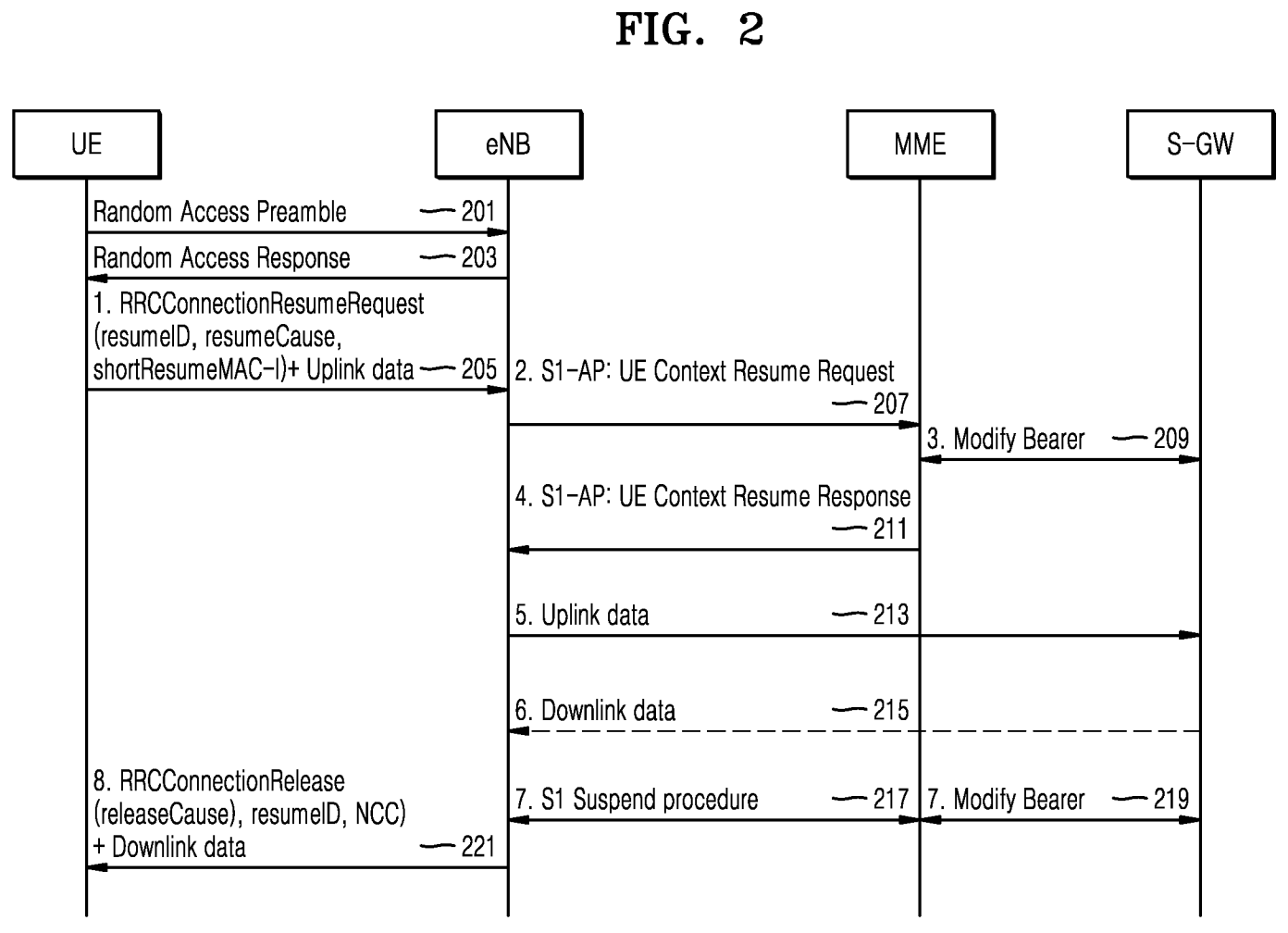

FIG. 2 is a flow chart illustrating another method of performing EDT.

Upon connection resumption request for Mobile Originated data from the upper layers, the UE may initiate the early data transmission procedure and select a random access preamble configured for the EDT.

In step 201, the UE may transmit, to the eNB, the random access preamble configured for the EDT.

In step 203, the UE may receive, from the eNB, a random access preamble response in response to the transmitted random access preamble.

In step 205, the UE may transmit an RRCConnectionResumeRequest message to the eNB, including its Resume ID, the resume cause, an authentication token and shortResumeMAC-1. The UE may resume all signal radio bears (SRBs) and data radio bears (DRBs) and may derive new security keys using the NextHopChainingCount provided in the RRCConnectionRelease message of the previous connection and may re-establish the access stratum (AS) security. The user data are ciphered and transmitted on DTCH multiplexed with the RRCConnectionResumeRequest message on CCCH.

In step 207, the eNB may initiate the S1-AP Context Resume procedure to resume the S1 connection and re-activate the S1-U bearers. For example, the eNB may transmit, to the MME, UE context resume request message associated with the S1-AP.

In step 209, the MME may request the S-GW to re-activate the S1-U bearers for the UE.

In step 211, the MME may confirm the UE context resumption to the eNB. For example, the MME may transmit, to the eNB, UE context resume response message associated with the S1-AP.

In step 213, uplink data are delivered to the S-GW. For example, the eNB may transmit the uplink data to the S-GW.

In step 215, if downlink data are available, the S-GW may transmit the downlink data to the eNB.

In step 217, if no further data are expected from the S-GW, the eNB may initiate the suspension of the S1 connection and in step 219, the eNB may initiate a deactivation of the S1-U bearers.

In step 221, the eNB may transmit, to the UE, the RRCConnectionRelease message to keep the UE in RRC_IDLE. The message may include the releaseCause set to rrc-Suspend, the resumeID, the NextHopChainingCount (NCC) and drb-ContinueROHC which are stored by the UE. If downlink data were received in step 215, the downlink data are sent ciphered on DTCH multiplexed with the RRCConnectionRelease message on DCCH.

If the MME or eNB decides the UE to move in RRC_CONNECTED mode, RRCConnectionResume message is sent in step 221 to fall back to the RRC Connection resume procedure. In that case, the RRCConnectionResume message is integrity protected and ciphered with the keys derived in step 205 and the UE may ignore the NextHop-ChainingCount included in the RRCConnectionResume message. Downlink data can be transmitted on DTCH multiplexed with the RRCConnectionResume message.

4G and 5G wireless communication system support vehicular communication services. Vehicular communication services, represented by vehicle to everything (V2X) services, may comprise the following four different types: vehicle to vehicle (V2V), vehicle to infra (V2I), vehicle to nomadic devices (V2N) and vehicle to pedestrian (V2P). In 5G communication system, V2X communication is being enhanced to support enhanced V2X use cases, which are broadly arranged into four use case groups:

Vehicle Platooning enables the vehicles to dynamically form a platoon travelling together. All the vehicles in the platoon obtain information from the leading vehicle to manage the platoon. The information allows the vehicles to drive closer than normal in a coordinated manner, going to the same direction and travelling together.

Extended Sensors enable the exchange of raw or processed data gathered through local sensors or live video images among vehicles, road site units, devices of pedestrian and V2X application servers. The vehicles may increase the perception of their environment beyond of what their own sensors can detect and have a more broad and holistic view of the local situation. High data rate is one of the key characteristics.

Advanced Driving enables semi-automated or full-automated driving. Each vehicle and/or roadside unit (RSU) shares its own perception data obtained from its local sensors with vehicles in proximity and that allows vehicles to synchronize and coordinate their trajectories or maneuvers. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by radio access network (RAN) and when the UE is outside of RAN coverage. Only the UEs authorized to be used for V2X services may perform NR or V2X sidelink communication.

FIG. 3 is a diagram illustrating NG-architecture supporting PC5 interface.

The NG-RAN architecture supports the PC5 interface as illustrated in FIG. 3. Sidelink transmission and reception over the PC5 interface are supported when the UE is inside NG-RAN coverage, irrespective of which RRC state the UE is in, and when the UE is outside NG-RAN coverage.

Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes: Unicast transmission, characterized by support of at least one PC5-RRC connection between peer UEs; Transmission and reception of control information and user traffic between peer UEs in sidelink; Support of sidelink HARQ feedback; Support of radio link control (RLC) acknowledge mode (AM); and Support of sidelink radio link monitoring (RLM) for both peer UEs to detect radio link failure (RLF). Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The AS protocol stack for the control plane in the PC5 interface may comprise RRC, packet data convergence protocol (PDCP), RLC and MAC sublayer, and the physical layer. The AS protocol stack for user plane in the PC5 interface may comprise service data adaption protocol (SDAP), PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization (LCP) restrictions in MAC, only sidelink logical channels belonging to the same destination can be multiplexed into a MAC PDU for every unicast, groupcast and broadcast transmission which is associated with the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH;

SBCCH can be mapped to SL-BCH.

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:

The UE needs to be RRC_CONNECTED in order to transmit data;

NG-RAN schedules transmission resources.

UE autonomous resource selection, characterized by:

The UE can transmit data when inside NG-RAN coverage, irrespective of which RRC state the UE is in, and when outside NG-RAN coverage;

The UE autonomously selects transmission resources from a pool of resources.

For NR sidelink communication, the UE performs sidelink transmissions only on a single carrier.

Scheduled Resource Allocation: NG-RAN can dynamically allocate resources to the UE via the SL-RNTI on PDCCH(s) for NR sidelink Communication. In addition, NG-RAN can allocate sidelink resources to UE with two types of configured sidelink grants:

With type 1, RRC directly provides the configured sidelink grant for NR sidelink communication With type 2, RRC provides the periodicity of the configured sidelink grant while PDCCH can either signal and activate the configured sidelink grant, or deactivate it. The PDCCH provides the actual grant (i.e. resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE may transmit sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE Autonomous Resource Allocation: The UE autonomously selects sidelink grant from a pool of resources provided by broadcast system information or dedicated signaling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with global navigation satellite system (GNSS) in case that GNSS is configured as synchronization source. If the exceptional transmission resource pool is included in the handover command, the UE may use randomly selected resources from the exceptional transmission resource pool for scheduling data from all sidelink logical channels or radio bearers, starting from the reception of handover command. If the UE is configured with scheduled resource allocation in the handover command, the UE continues to use the exceptional transmission resource pool while the timer associated with handover is running for scheduling data from all sidelink logical channels or radio bearers.

If the UE is configured with autonomous resource selection in the target cell the UE continues to use the exceptional transmission resource pool for scheduling data from all sidelink logical channels or radio bearers until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and may use them temporarily for scheduling data from all sidelink logical channels or radio bearers. During cell reselection, the RRC_IDLE UE may use the randomly selected resources from the exceptional transmission resource pool of the reselected cell for scheduling data from all sidelink logical channels or radio bearers until the sensing results on the transmission resource pools for autonomous resource selection are available.

UE can be configured with either scheduled (Mode 1) or autonomous (Mode 2) resource allocation in target cell. During handover, when the UE is configured with only one mode, interruption handling mechanism depends on configured mode. For example, if mode 1 is configured, UE uses exceptional resource pool until handover is completed; else if mode 2 is configured, UE uses exceptional resource pool until sensing results are available. The exceptional resource pool is used for scheduling data from all sidelink logical channels or radio bearers. Resource allocation is being enhanced to allow UE to use both scheduled and autonomous resource allocation. The interruption handling considering configuration of mode 1 and mode 2 concurrently needs to be defined.

In accordance with an embodiment of the disclosure, interruption Handling for sidelink logical channels during handover is provided.

Figure 4:
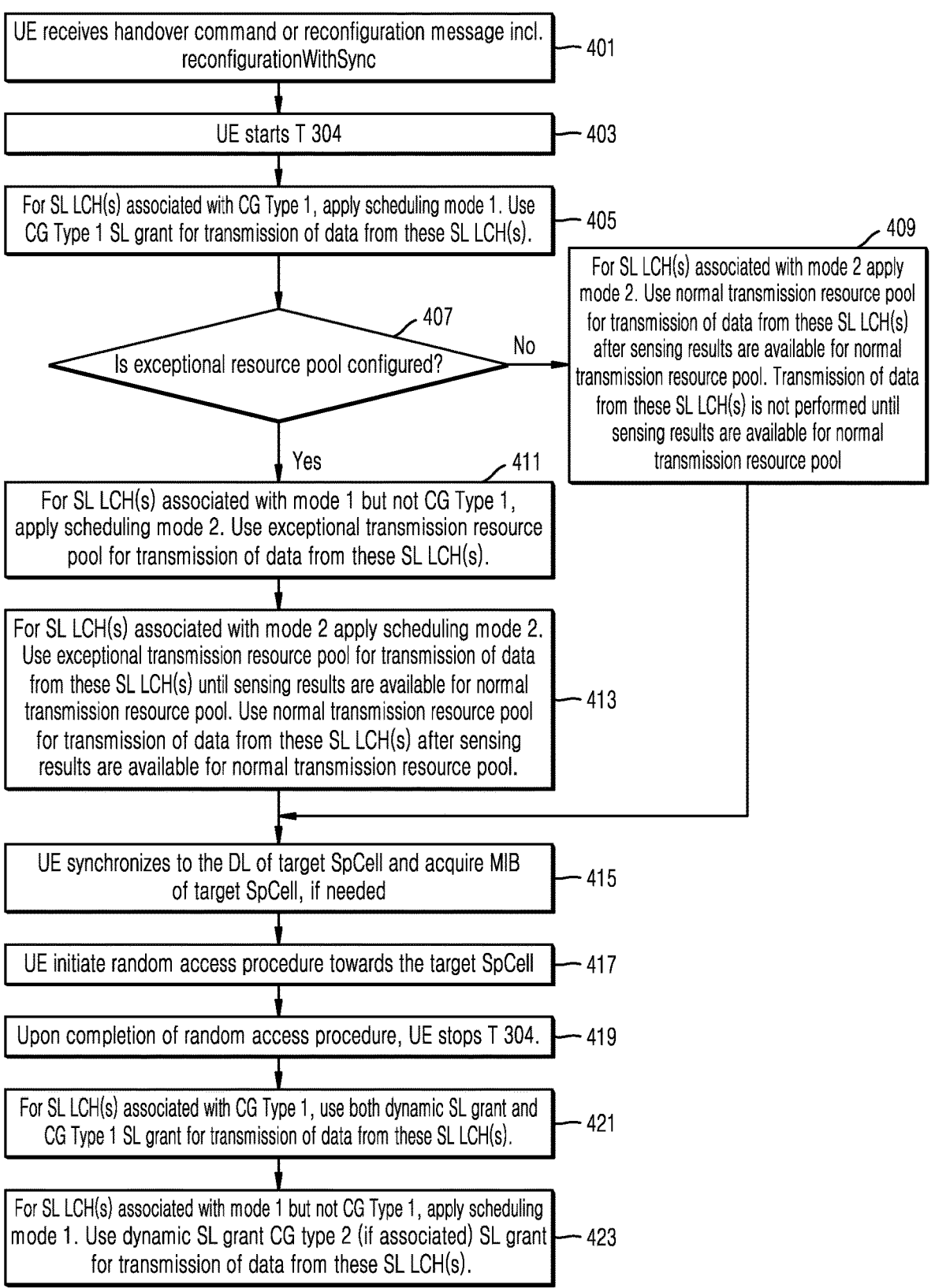
FIG. 4 is a flow chart illustrating a method of performing an interruption handling according to a first embodiment of the disclosure.

FIG. 4 is a flow chart illustrating a method of performing an interruption handling according to a first embodiment of the disclosure.

Method 1:

UE may be in RRC Connected state and may perform NR sidelink communication using resource configuration (scheduled resource allocation or autonomous resource allocation or both scheduled and autonomous resource allocation) provided by the serving cell (the serving cell can be PCell in an embodiment, the serving cell can be SpCell in another embodiment).

In RRC Connected state, UE may receive from network (i.e. base station or source PCell or source SpCell) handover or RRC reconfiguration message including reconfiguration-WithSync in step 401. The RRC reconfiguration message configures scheduled resource allocation (also referred to as Mode 1) or autonomous resource allocation (also referred to as Mode 2) or both scheduled and autonomous resource allocation in the target cell (the target cell can be PCell in an embodiment, the target cell can be SpCell in another embodiment). The RRC reconfiguration message may also include configured grant (CG) Type 1 SL grant configuration in the target cell. The RRC reconfiguration message may also indicate one or more SL LCH(s) which are allowed to use CG Type 1 SL grant. The RRC reconfiguration message may also indicate one or more SL LCH(s) which are allowed to use Mode 2 resources. The RRC reconfiguration message may also indicate one or more SL LCH(s) which are allowed to use Mode 1 resources (i.e. mode 1 resources other than CG Type 1 SL grant). Exceptional resource pool for transmission may also be configured by the RRC reconfiguration message. UE may start a timer such as T304 in step 403.

In one method (as shown in FIG. 4) of the disclosure, it is proposed that upon receiving the handover command or RRC reconfiguration message including reconfiguration-WithSync:

For SL LCH(s) associated with CG Type 1 resources/grants, UE applies scheduling mode 1 upon receiving handover command in step 405. For SL LCH(s) associated with CG Type 1 resources/grants, UE starts using the CG Type 1 grants/resources upon receiving handover command in step 405. For SL LCH(s) associated with CG Type 1 resources/grants, UE uses CG Type 1 grants/resources until handover is completed (i.e. while the timer T 304 is running). For SL LCH(s) associated with CG Type 1 resources/grants, upon handover completion (i.e. upon completion of random access on target cell) UE uses both dynamic grant and CG type 1 grants/resources in step 421.

For SL LCHs associated with mode 1 but not CG Type 1 resources/grants, UE performs the following:

If exceptional transmission resource pool is configured in reconfiguration message ("Yes" in step 407), UE applies scheduling mode 2 (i.e. scheduling mode 2 resources are used for SL transmission of SL LCHs associated with mode 1 but not CG Type 1) until handover is completed in step 411. Exceptional transmission resource pool is used for transmission until handover is completed (i.e. while the timer T 304 is running).

If exceptional transmission resource pool is not configured in the reconfiguration message ("No" in step 407), until handover is completed, transmission of data from the SL LCHs associated with the mode 1 but not CG Type 1 resources/grants may not be performed.

UE applies/uses scheduling mode 1 (i.e. scheduling mode 1 resources are used for SL transmission of SL LCHs associated with mode 1 but not CG Type 1 resources/grants)

after handover is completed in step 423. Upon handover completion dynamic grant and CG type 2 (if associated) is applied/used in step 423.

For SL LCHs associated with mode 2:

UE applies scheduling mode 2 (i.e. scheduling mode 2 resources are used for SL transmission of SL LCHs associated with mode 2). If exceptional transmission resource pool is configured (Yes' in step 407), use exceptional transmission resource pool (i.e. exceptional transmission resource pool resources are used for SL transmission of SL LCHs associated with mode 2) until sensing results are available for normal transmission resource pool in step 413. After sensing results are available for normal transmission resource pool, UE uses normal transmission resource pool (i.e. normal transmission resource pool resources are used for SL transmission of SL LCHs associated with mode 2) configured in reconfiguration message in step 413.

If exceptional transmission resource pool is not configured in the reconfiguration message ("No" in step 407), in step 409, the UE may apply the scheduling mode 2 for SL LCHs associated with the mode 2. Until sensing results are available for normal transmission resource pool, transmission of data from the SL LCHs associated with the mode 2 may not be performed. After the sensing results are available for normal transmission resource pool, the UE may use normal transmission resource pool for transmission of data from the SL LCHs associated with the mode 2.

In step 415, the UE may synchronize to the DL of target SpCell and acquire MIB of target SpCell, if needed. In step 417, the UE may initiate random access procedure towards the target SpCell. In step 419, the UE may stop T304 upon completion of the random access procedure.

Figure 5:
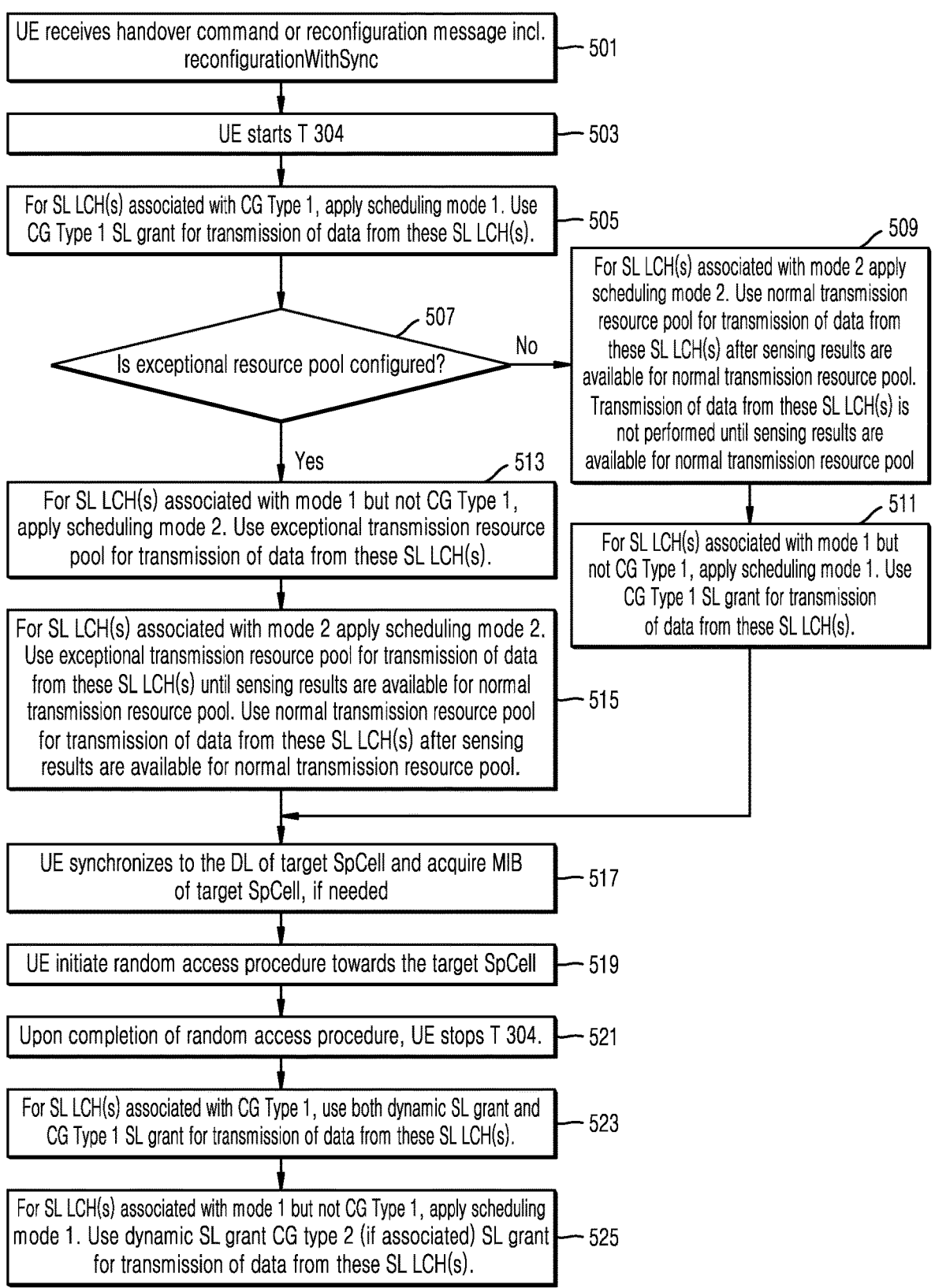
FIG. 5 is a flow chart illustrating a method of performing an interruption handling according to a second embodiment of the disclosure.

FIG. 5 is a flow chart illustrating a method of performing an interruption handling according to a second embodiment of the disclosure.

Method 2:

UE is in RRC Connected state and is performing NR sidelink communication using resource configuration (scheduled resource allocation or autonomous resource allocation or both scheduled and autonomous resource allocation) provided by the serving cell (the serving cell can be PCell in an embodiment, the serving cell can be SpCell in another embodiment).

In RRC Connected state, UE receives from network (i.e. base station or source PCell or source SpCell) handover or RRC reconfiguration message including reconfiguration-WithSync in step 501. The reconfiguration message configures scheduled resource allocation (also referred as Mode 1) or autonomous resource allocation (also referred as Mode 2) or both scheduled and autonomous resource allocation in the target cell (the target cell can be PCell in an embodiment, the target cell can be SpCell in another embodiment). The reconfiguration message may also include CG Type 1 SL grant configuration in the target cell. The reconfiguration message also indicates the one or more SL LCH(s) which are allowed to use CG Type 1 SL grant. The reconfiguration message also indicates the one or more SL LCH(s) which are allowed to use Mode 2 resources. The reconfiguration message also indicates the one or more SL LCH(s) which are allowed to use Mode 1 resources (i.e. mode 1 resources other than CG Type 1 SL grant). Exceptional resource pool for transmission may also be configured by the reconfiguration message. UE may start a timer such as T304 in step 503.

In one method (as shown in FIG. 5) of this disclosure it is proposed that upon receiving the handover command or RRC reconfiguration message including reconfiguration-WithSync:

For SL LCH(s) associated with CG Type 1 resources/ grants, UE applies scheduling mode 1 upon receiving handover command in step 505. For SL LCH(s) associated with CG Type 1 resources/grants, UE starts using the CG Type 1 grants/resources upon receiving handover command in step 505. For SL LCH(s) associated with CG Type 1 resources/ grants, UE uses CG Type 1 grants/resources until handover is completed (i.e. while the timer T 304 is running). For SL LCH(s) associated with CG Type 1 resources/grants, upon handover completion (i.e. upon completion of random access on target cell) UE uses both dynamic grant and CG type 1 grants/resources in step 523.

For SL LCHs associated with mode 1 but not CG Type 1 resources/grants, UE performs the following:

If exceptional transmission resource pool is configured in reconfiguration message (Yes' in step 507):

UE applies scheduling mode 2 (i.e. scheduling mode 2 resources are used for SL transmission of SL LCHs associated with mode 1 but not CG Type 1 resources/grants) until handover is completed in step 513. Exceptional transmission resource pool is used for transmission until handover is completed (i.e. while the timer T 304 is running).

UE applies/uses scheduling mode 1 (i.e. scheduling mode 1 resources are used for SL transmission of SL LCHs associated with mode 1 but not CG Type 1 resources/grants) after handover is completed in step 525. Upon handover completion dynamic grant and CG type 2 (if associated) is applied/used in step 525.

If exceptional transmission resource pool is not configured ('No' in step 507) and CG Type 1 sidelink resources are configured in reconfiguration message:

In step 511, UE applies scheduling mode 1 upon receiving handover command for the SL LCHs, which are associated with the mode 1 but not associated with the CG Type 1 SL grant.

UE uses/applies CG Type 1 sidelink grant for these SL LCHs until handover is completed. Upon handover completion dynamic grant and CG type 2 (if associated) is applied/ used.

For SL LCHs associated with mode 2:

UE applies scheduling mode 2 (i.e. scheduling mode 2 resources are used for SL transmission of SL LCHs associated with mode 2) in step 515. If exceptional transmission resource pool is configured (Yes' in step 507), use exceptional transmission resource pool (i.e. exceptional transmission resource pool resources are used for SL transmission of SL LCHs associated with mode 2) until sensing results are available for normal transmission resource pool in step 515. After sensing results are available for normal transmission resource pool, UE uses normal transmission resource pool (i.e. normal transmission resource pool resources are used for SL transmission of SL LCHs associated with mode 2) configured in reconfiguration message in step 515.

If the exceptional resource pool is not configured in the reconfiguration message ('No' in step 507), in step 509, the UE may apply the scheduling mode 2 for the SL LCHs associated with the mode 2. Until sensing results are available for normal transmission resource pool, transmission of data from the SL LCHs associated with the mode 2 may not be performed. After the sensing results are available, the UE may use the normal transmission resource pool for transmission of the data from the SL LCHs.

In step 517, the UE may synchronize to the DL of target SpCell and acquire MIB of target SpCell, if needed. In step 519, the UE may initiate random access procedure towards the target SpCell. In step 521, the UE may stop T304 upon completion of the random access procedure.

Figure 6:
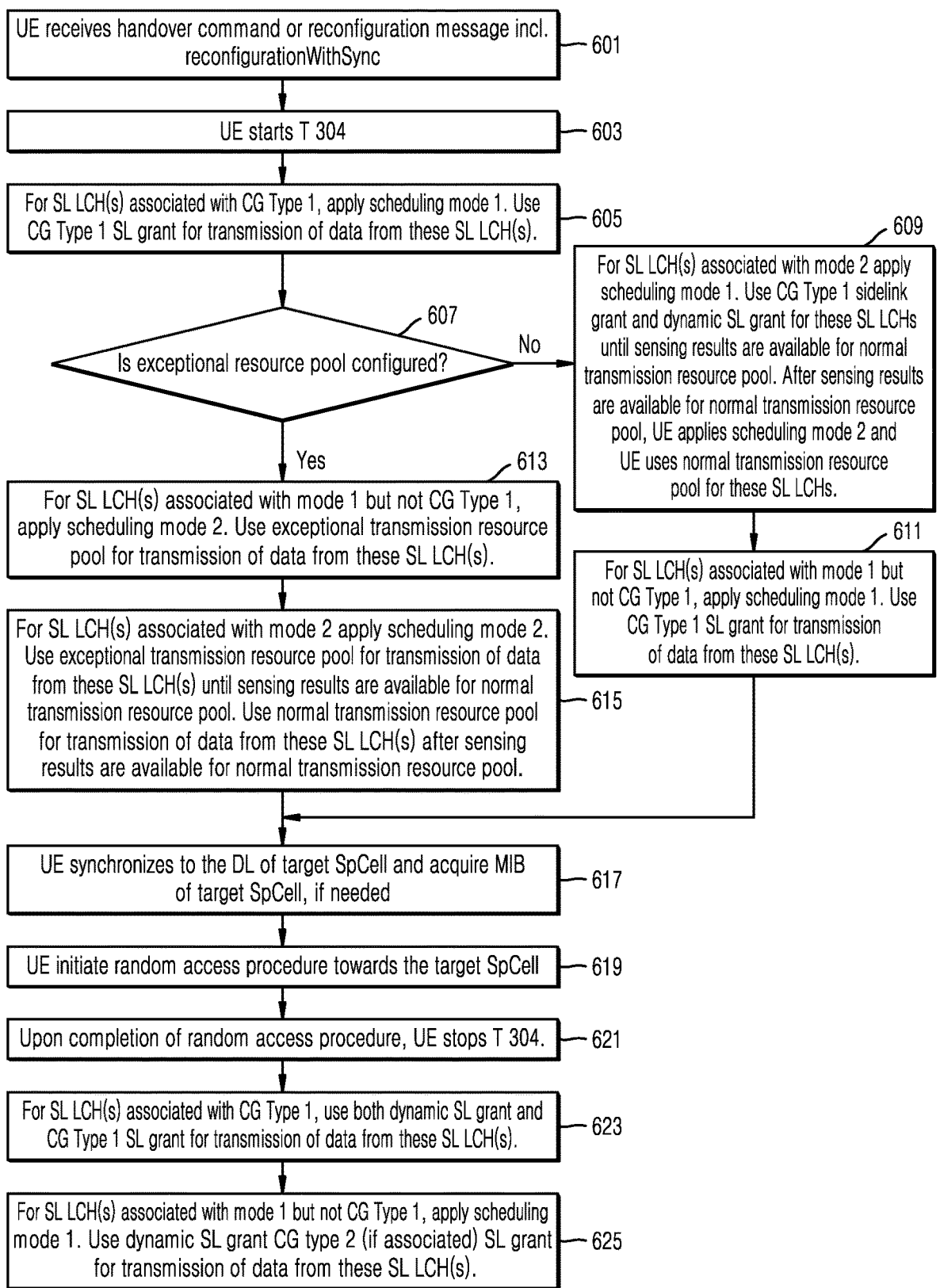
FIG. 6 is a flow chart illustrating a method of performing an interruption handling according to a third embodiment of the disclosure.

FIG. 6 is a flow chart illustrating a method of performing an interruption handling according to a third embodiment of the disclosure.

Method 3:

UE is in RRC Connected state and is performing NR sidelink communication using resource configuration (scheduled resource allocation or autonomous resource allocation or both scheduled and autonomous resource allocation) provided by the serving cell (the serving cell can be PCell in an embodiment, the serving cell can be SpCell in another embodiment).

In RRC Connected state, UE receives from network (i.e. base station or source PCell or source SpCell) handover or RRC reconfiguration message including reconfiguration-WithSync in step 601. The reconfiguration message configures scheduled resource allocation (also referred as Mode 1) or autonomous resource allocation (also referred as Mode 2) or both scheduled and autonomous resource allocation in the target cell (the target cell can be PCell in an embodiment, the target cell can be SpCell in another embodiment). The reconfiguration message may also include CG Type 1 SL grant configuration in the target cell. The reconfiguration message also indicates the one or more SL LCH(s) which are allowed to use CG Type 1 SL grant. The reconfiguration message also indicates the one or more SL LCH(s) which are allowed to use Mode 2 resources. The reconfiguration message also indicates the one or more SL LCH(s) which are allowed to use Mode 1 resources (i.e. mode 1 resources other than CG Type 1 SL grant). Exceptional resource pool for transmission may also be configured by the reconfiguration message. The UE may start a timer such as T304 in step 603.

In one method (as shown in FIG. 6) of this disclosure it is proposed that upon receiving the handover command or RRC reconfiguration message including reconfiguration-WithSync:

For SL LCH(s) associated with CG Type 1 resources/ grants, UE applies scheduling mode 1 upon receiving handover command in step 605. For SL LCH(s) associated with CG Type 1 resources/grants, UE starts using the CG Type 1 grants/resources upon receiving handover command in step 605. For SL LCH(s) associated with CG Type 1 resources/ grants, UE uses CG Type 1 grants/resources until handover is completed (i.e. while the timer T 304 is running). For SL LCH(s) associated with CG Type 1 resources/grants, upon handover completion (i.e. upon completion of random access on target cell) UE uses both dynamic grant and CG type 1 grants/resources in step 623.

For SL LCHs associated with mode 1 but not CG Type 1 resources/grants, UE performs the following:

If exceptional transmission resource pool is configured in reconfiguration message (Yes' in step 607):

UE applies scheduling mode 2 (i.e. scheduling mode 2 resources are used for SL transmission of SL LCHs associated with mode 1 but not CG Type 1 resources/grants) until handover is completed in step 613. Exceptional transmission resource pool is used for transmission until handover is completed (i.e. while the timer T 304 is running) in step 613.

In step 625, the UE applies/uses scheduling mode 1 (i.e. scheduling mode 1 resources are used for SL transmission of SL LCHs associated with mode 1 but not CG Type 1 resources/grants) after handover is completed. Upon handover completion dynamic grant and CG type 2 (if associated) is applied/used.

If exceptional transmission resource pool is not configured ('No' in step 607) and CG Type 1 sidelink resources are configured in reconfiguration message:

in step 611, the UE applies scheduling mode 1 for SL LCHs associated with the mode 1 but not the CG Type 1 resources/grants upon receiving handover command.

In step 625, the UE uses/applies CG Type 1 sidelink grant for these SL LCHs until handover is completed. Upon handover completion dynamic grant and CG type 2 (if associated) is applied/used.

For SL LCHs associated with mode 2:

If exceptional transmission resource pool is configured in reconfiguration message (yes' in step 607):

the UE applies scheduling mode 2 (i.e. scheduling mode 2 resources are used for SL transmission of SL LCHs associated with mode 2) in step 615. Use exceptional transmission resource pool (i.e. exceptional transmission resource pool resources are used for SL transmission of SL LCHs associated with mode 2) until sensing results are available for normal transmission resource pool in step 615. After sensing results are available for normal transmission resource pool, UE uses normal transmission resource pool (i.e. normal transmission resource pool resources are used for SL transmission of SL LCHs associated with mode 2) configured in reconfiguration message in step 615.

If exceptional transmission resource pool is not configured (no' in step 607) and CG Type 1 sidelink resources are configured in reconfiguration message:

in step 609, UE applies scheduling mode 1 for SL LCHs associated with the mode 2 upon receiving handover command.

UE uses/applies CG Type 1 sidelink grant and dynamic SL grant for these SL LCHs until sensing results are available for normal transmission resource pool in step 609.

After sensing results are available for normal transmission resource pool, UE applies scheduling mode 2 and UE uses normal transmission resource pool (i.e. normal transmission resource pool resources are used for SL transmission of SL LCHs associated with mode 2) configured in reconfiguration message in step 609.

In step 617, the UE may synchronize to the DL of target SpCell and acquire MIB of target SpCell, if needed. In step 619, the UE may initiate random access procedure towards the target SpCell. In step 621, the UE may stop T304 upon completion of the random access procedure.

Figure 7:
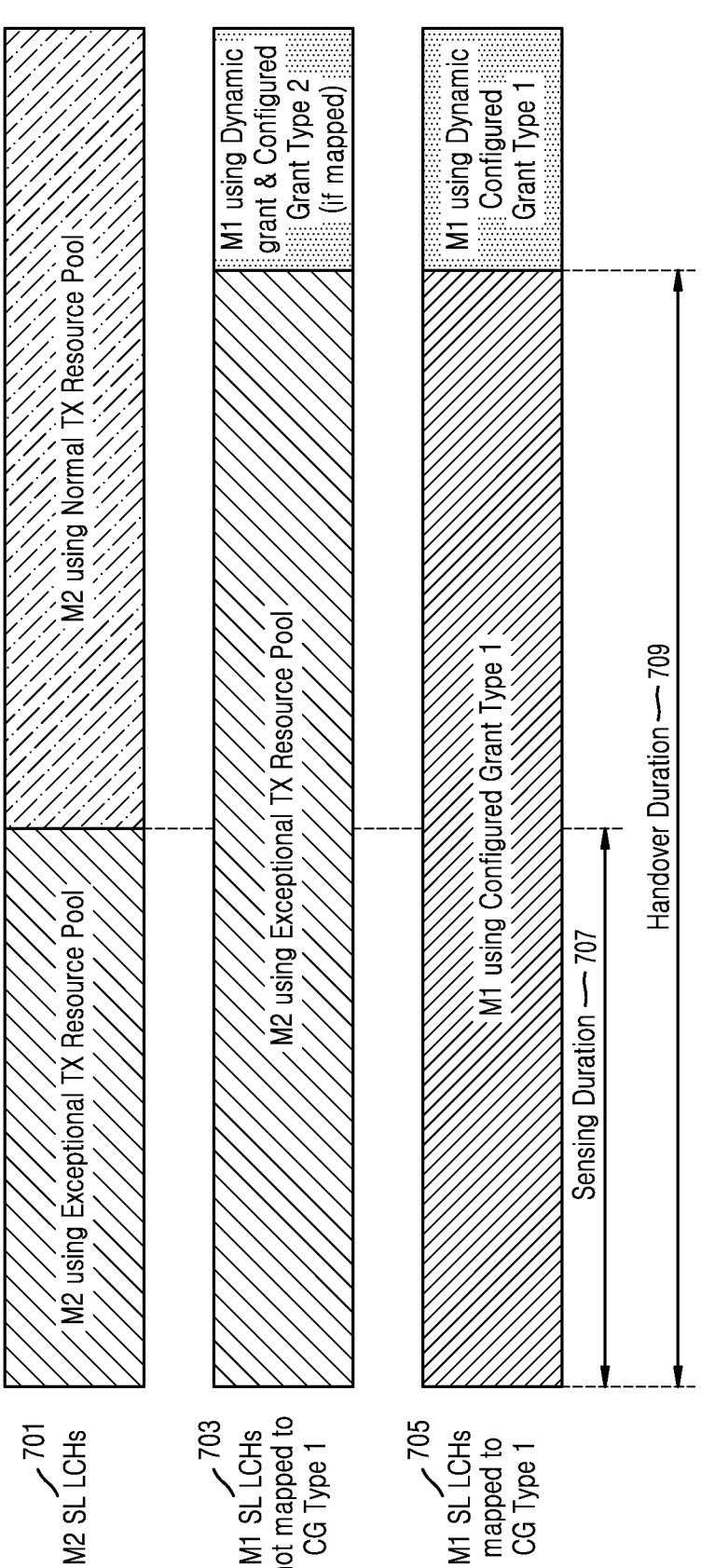
FIG. 7 is a diagram illustrating a method of handling a schedule mode during a handover according to an embodiment of the disclosure.

FIG. 7 is a diagram illustrating a method of handling a schedule mode during a handover according to an embodiment of the disclosure.

Referring to FIG. 7, in a case 701 where one or more SL LCHs are associated with a second scheduling mode, a terminal may apply the second scheduling mode and may use an exceptional transmission (TX) resource pool for transmitting data from the one or more SL LCHs to a target node until sensing results are available. The target node may indicate a target for a handover and the term "second scheduling mode" may be used interchangeably with at least one of the mode 2 and the autonomous resource allocation. In an embodiment, the source node and the target node may correspond to the same base station or the source node and the target node may correspond to different base station.

A sensing duration 707 may indicate a time required for sensing resources based on the second scheduling mode. A start time point of the sensing duration 707 may be a time point when the terminal receives a handover command or RRC reconfiguration message from a source node and an end time point of the sensing duration 707 may be a time point when the sensing results are available.

According to an embodiment of the disclosure, the terminal may apply the second scheduling mode and may use the exceptional TX resource pool during the sensing duration 707 in case that the one or more SL LCHs are associated with the second scheduling mode and the exceptional TX resource pool is configured. When the sensing results are available, the terminal may maintain applying the scheduling mode 2 and may use normal TX resource pool for transmitting data from the SL LCHs.

In case that the exceptional TX resource pool is not configured and a CG Type 1 SL grant is configured, the terminal may apply a first scheduling mode and use the CG Type 1 SL grant until the sensing results are available. The term "first scheduling mode" may be used interchangeably with at least one of the mode 1 and scheduled resource allocation. After the sensing results are available, the terminal may apply the scheduling mode 2 and use a normal resource pool for transmission of data from the one or more SL LCHs associated with the scheduling mode 2.

In an embodiment, in a case 703 where one or more SL LCHs are associated with a first scheduling mode and are unmapped to the CG Type 1 SL grant, the terminal may apply the second scheduling mode and may use an exceptional TX resource pool for transmitting data from the one or more SL LCHs to the target node, until a handover is completed. Specifically, in case that the exceptional TX resource pool is configured, the terminal may apply the second scheduling mode and may use the exceptional TX resource pool for transmitting data from the one or more SL LCHs, which are associated with the first scheduling mode and are not associated with the CG Type 1 SL grant.

A handover duration 709 may indicate a time required for completing the handover. A start point of the handover duration 709 may be a time point when the terminal receives the handover command or the RRC reconfiguration message and an end point of the handover duration 709 may be a time point when the handover is completed.

In accordance with the disclosure, in case that the exceptional TX resource pool is configured, the terminal may apply the scheduling mode 2 and may use the exceptional TX resource pool for transmitting data from the one or more SL LCHs that are associated with the scheduling mode 1 and unmapped to the CG Type 1 SL grant. When the handover is completed, the terminal may apply the scheduling mode 1 and may use dynamic grant and CG Type 2 SL grant in case that the one or more SL LCHs are mapped to the CG Type 2 SL grant.

In another embodiment, in case that the exceptional TX resource pool is not configured and the CG Type 1 SL grant is configured, the terminal may apply the scheduling mode 1 and may use the CG Type 1 SL grant for transmitting data from the one or more SL LCHs which are associated with the scheduling mode 1 and are not associated with the CG Type 1 SL grant.

For example, in a case 705 where one or more SL LCHs are associated with the scheduling mode 1 and are unmapped to the CG Type 1 SL grant, if the exceptional TX resource pool is not configured and the CG Type 1 SL grant is configured, the terminal may apply the scheduling mode 1 and may use the CG Type 1 SL grant for transmitting data from the one or more SL LCHs to the target node, until the handover is completed. That is, the terminal may apply the scheduling mode 1 and may use the CG Type 1 SL grant for transmitting data from the one or more SL LCHs that are associated with the scheduling mode 1 and unmapped to the CG Type 1 SL grant during the handover duration 709 if the exceptional TX resource is not configured and the CG Type 1 SL grant is configured. After completion of the handover, the terminal may maintain applying the scheduling mode 1 and may use a dynamic grant and the CG Type 1 SL grant.

Figure 8:
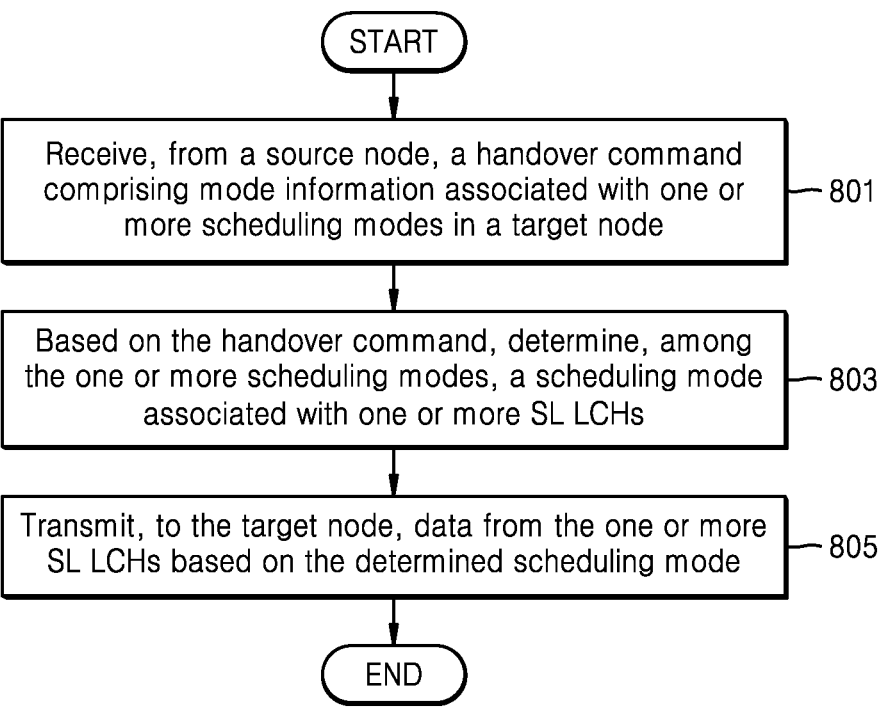
FIG. 8 is a flowchart illustrating a method for handling a scheduling mode during a handover in a wireless communication system according to an embodiment of the disclosure.

FIG. 8 is a flowchart illustrating a method for handling a scheduling mode during a handover in a wireless communication system according to an embodiment of the disclosure.

In step 801, a terminal may receive, from a source node, a handover command comprising mode information associated with one or more scheduling modes in a target node. The handover command may further comprise exceptional resource pool information associated with an exceptional resource pool configuration. The handover command may further comprise configured grant (CG) type information associated with a CG Type 1 SL grant configuration for the one or more SL LCHs. Specifically, the one or more scheduling modes may comprise a first scheduling mode associated with a scheduled resource allocation and a second scheduling mode associated with an autonomous resource allocation.

In step 803, the terminal may determine, among the one or more scheduling modes, a scheduling mode associated with one or more sidelink logical channels (SL LCHs), based on the handover command. In an embodiment, the terminal may determine a scheduling mode of a first SL LCH associated with the CG Type 1 SL grant as the first scheduling mode.

In an embodiment, in case that a second SL LCH is associated with the first scheduling mode, the second SL LCH is unmapped to the CG Type 1 SL grant and the exceptional resource pool is configured, the terminal may determine a scheduling mode of the second SL LCH as the second scheduling mode.

In an embodiment, in case that a third SL LCH is associated with the first scheduling mode, the third SL LCH is unmapped to the CG Type 1 SL grant and the exceptional resource pool is not configured, the terminal may determine a scheduling mode of the third SL LCH as the first scheduling mode.

In an embodiment, in case that a fourth SL LCH is associated with the second scheduling mode and the exceptional pool is configured, the terminal may determine a scheduling mode of the fourth SL LCH as the second scheduling mode.

In an embodiment, in case that a fifth SL LCH is associated with the second scheduling mode and the exceptional resource pool is not configured, the terminal may determine a scheduling mode of the fifth SL LCH as the first scheduling mode.

In step 805, the terminal may transmit, to the target node, data from the one or more SL LCHs, based on the determined scheduling mode. In an embodiment, the terminal may transmit, to the target node, first data from the first SL LCH based on the first scheduling mode and the CG Type 1 SL grant, until a handover is completed.

In an embodiment, the terminal may transmit, to the target node, second data from the second SL LCH based on the second scheduling mode and the exceptional resource pool, until a handover is completed.

In an embodiment, the terminal may transmit, to the target node, third data from the third SL LCH based on the first scheduling mode and the CG Type 1 SL grant, until a handover is completed.

In an embodiment, the terminal may transmit, to the target node, fourth data from the fourth SL LCH based on the second scheduling mode and the exceptional resource pool, until sensing results are available.

In an embodiment, the terminal may transmit, to the target node, fifth data from the fifth SL LCH based on the first scheduling mode and the CG Type 1 SL grant, until sensing results are available.

In accordance with the disclosure, a triggering condition for Small Data Transmission is provided.

In LTE, early data transmission (EDT) allows one uplink data transmission optionally followed by one downlink data transmission during the random access procedure. EDT is triggered when the upper layers have requested the establishment or resumption of the RRC Connection for Mobile Originated data (i.e., not signaling or SMS) and the uplink data size is less than or equal to a TB size (edt-TBS-r15) indicated in the system information (i.e., SIB 2) of camped or serving cell.

In NR, the camped or serving cell can be configured with supplementary uplink carrier in addition to normal uplink carrier. Additionally, camped or serving cell can be configured with 2 step RA in additional to 4 step RA. UE selects the UL carrier and RACH type based on RSRP threshold. In NR, for small data transmission or early data transmission, amount of data available for transmission can be compared against a threshold, where threshold (or data threshold or data volume threshold) is configured by gNB.

Method 1:

In one embodiment of the disclosure, it is proposed that data size (or data threshold or data volume threshold) for small data transmission is configured separately for 2 step RACH on NUL, 2 step RACH on SUL, 4 step RACH on NUL and 4 step RACH on SUL.

If small data transmission using 4 step RACH is supported by the camped or serving cell on NUL: 4 step RACH configuration for NUL includes data size or data threshold or data volume threshold (i.e., signaled by gNB using parameter sdt-dataSz) for small data transmission. If small data transmission using 2 step RACH is supported by the camped or serving cell on NUL: 2 step RACH configuration for NUL includes data size or data threshold or data volume threshold (i.e., signaled by gNB using parameter sdt-dataSz) for small data transmission.

If small data transmission using 4 step RACH is supported by the camped or serving cell on SUL: 4 step RACH configuration for SUL includes data size or data threshold or data volume threshold (i.e., signaled by gNB using parameter sdt-dataSz) for small data transmission. If small data transmission using 2 step RACH is supported by the camped or serving cell on SUL: 2 step RACH configuration for SUL includes data size or data threshold or data volume threshold (i.e., signaled by gNB) for small data transmission.

In an embodiment, if SUL selection criteria are met and if 2 step RA selection criteria is met on SUL:

If parameter 'sdt-dataSz' is configured in 2 step RA configuration of SUL (or 'sdt-dataSz' is configured for 2 step RA on SUL) and total amount of uplink data to be transmitted is less than or equal to sdt-dataSz (or less than sdt-dataSz):

perform small data transmission using 2 step RA

UE initiate 2 step RA on SUL for small data transmission.

Uplink data is transmitted in MsgA MAC PDU.

Else:

Do not perform small data transmission.

UE initiate 2 step RA on SUL for connection resume/establishment.

Uplink data is not transmitted in MsgA MAC PDU.

In an embodiment, if SUL selection criteria are met and if 2 step RA selection criteria is met on SUL:

If parameter 'sdt-dataSz' is configured in 2 step RA configuration of SUL (or 'sdt-dataSz' is configured for 2 step RA on SUL) and total amount of uplink data to be transmitted is less than or equal to sdt-dataSz:

perform small data transmission using 2 step RA

UE initiate 2 step RA on SUL for small data transmission.

Uplink data is transmitted in MsgA MAC PDU.

Else If parameter 'sdt-dataSz' is configured in 4 step RA configuration of SUL and total amount of uplink data to be transmitted is less than or equal to sdt-dataSz(or less than sdt-dataSz):

perform small data transmission using 4 step RA

UE initiate 4 step RA on SUL for small data transmission.

Uplink data is transmitted in Msg3 MAC PDU.

Else:

Do not perform small data transmission.

UE initiate 2 step RA on SUL for connection resume/establishment.

Uplink data is not transmitted in MsgA MAC PDU.

In an embodiment, if NUL selection criteria is met and If 2 step RA selection criteria is met on NUL:

If sdt-dataSz is configured in 2 step RA configuration of NUL (or 'sdt-dataSz' is configured for 2 step RA on NUL) and total amount of uplink data to be transmitted<=sdt-dataSz:

perform small data transmission using 2 step RA

UE initiate 2 step RA on NUL for small data transmission.

Uplink data is transmitted in MsgA MAC PDU.

Else:

Do not perform small data transmission.

UE initiate 2 step RA on NUL for connection resume/establishment.

Uplink data is not transmitted in MsgA MAC PDU.

In an embodiment, if NUL selection criteria is met and If 2 step RA selection criteria is met on NUL:

If sdt-dataSz is configured in 2 step RA configuration of NUL (or 'sdt-dataSz' is configured for 2 step RA on NUL) and total amount of uplink data to be transmitted is less than or equal to sdt-dataSz (or less than sdt-dataSz):

perform small data transmission using 2 step RA

UE initiate 2 step RA on NUL for small data transmission.

Uplink data is transmitted in MsgA MAC PDU.

Else If parameter 'sdt-dataSz' is configured in 4 step RA configuration of NUL and total amount of uplink data to be transmitted is less than or equal to sdt-dataSz (or less than sdt-dataSz):

perform small data transmission using 4 step RA

UE initiate 4 step RA on NUL for small data transmission.

Uplink data is transmitted in Msg3 MAC PDU.

Else:

Do not perform small data transmission.

UE initiate 2 step RA on NUL for connection resume/establishment.

Uplink data is not transmitted in MsgA MAC PDU.

In an embodiment, if SUL selection criteria are met and if 4 step RA selection criteria is met on SUL:

If sdt-dataSz is configured in 4 step RA configuration of SUL (or 'sdt-dataSz' is configured for 4 step RA on SUL) and total amount of uplink data to be transmitted is less than or equal to sdt-dataSz (or less than sdt-dataSz):

perform small data transmission using 4 step RA

UE initiate 4 step RA on SUL for small data transmission.

Uplink data is transmitted in Msg3 MAC PDU during 4 step RA.

Else:

Do not perform small data transmission.

UE initiate 4 step RA on SUL for connection resume/establishment.

Uplink data is not transmitted in Msg3 MAC PDU.

In an embodiment, if NUL selection criteria is met and If 4 step RA selection criteria is met on NUL If sdt-dataSz is configured in 4 step RA configuration of NUL (or 'sdt-dataSz' is configured for 4 step RA on NUL) and total amount of uplink data to be transmitted is less than or equal to sdt-dataSz:

perform small data transmission using 4 step RA

UE initiate 4 step RA on NUL for small data transmission.

Uplink data is transmitted in Msg3 MAC PDU during 4 step RA.

Else:

Do not perform small data transmission.

UE initiate 4 step RA on NUL for connection resume/establishment.

Uplink data is not transmitted in Msg3 MAC PDU.

In an embodiment, if the UL BWP is configured with both 2 step and 4 step RACH resources:

if RSRP of the downlink pathloss reference is below a configured threshold and if small data transmission is supported on 4 step RACH, UE select 4 step RACH for small data transmission.

Else if RSRP of the downlink pathloss reference is not below a configured threshold and if small data transmission is supported on 2 step RACH, UE select 2 step RACH for small data transmission.

Else if RSRP of the downlink pathloss reference is not below a configured threshold and if small data transmission is not supported on 2 step RACH and if small data transmission is supported on 4 step RACH, UE select 4 step RACH for small data transmission.

In the above description criteria for SUL/NUL selection is as follows:

if the camped or serving Cell is configured with supplementary uplink and if the RSRP of the downlink pathloss reference is less than rsrp-ThresholdSSB-SUL: UE select the SUL carrier. Otherwise, UE select the NUL carrier. rsrp-ThresholdSSB-SUL is signaled by gNB.

In the above description criteria for 4 step RA/2 step RA selection is as follows:

if the UL BWP is configured with only 2 step RACH resources, UE selects 2 step RACH.

else if the UL BWP is configured with only 4 step RACH resources, UE selects 4 step RACH.

else if the UL BWP is configured with both 2 step and 4 step RACH resources:

if RSRP of the downlink pathloss reference is below a configured threshold, UE selects 4 step RACH. Otherwise, UE selects 2 step RACH.

In the above description, RACH configuration refers to RACH configuration of UL BWP which is selected for Random access procedure. For small data transmission in inactive state, RACH configuration refers to RACH configuration of initial UL BWP or 'UL BWP indicated (indication can be in connection release) by gNB for small data transmission', of selected UL carrier. 'Amount of data to be transmitted' is the total amount of data available (in bytes) of SDT DRB(s). The size of RLC headers and MAC headers are not included in computing amount of data available. So basically, the amount of data available is the number of PDCP PDUs multiplied by size of each PDCP PDU. In an embodiment, the size of RLC headers and/or MAC headers may also be included in computing amount of data available.

Method 2:

In one embodiment of the disclosure, it is proposed that data size (or data threshold or data volume threshold) for small data transmission is configured separately for 2 step RACH on NUL, 2 step RACH on SUL, 4 step RACH on NUL and 4 step RACH on SUL.

If small data transmission using 4 step RACH is supported by the camped or serving cell on NUL: 4 step RACH configuration for NUL includes data size or data threshold or data volume threshold (i.e., signaled by gNB using parameter sdt-dataSz) for small data transmission. If small data transmission using 2 step RACH is supported by the camped or serving cell on NUL: 2 step RACH configuration for NUL includes data size or data threshold or data volume threshold (i.e., signaled by gNB using parameter sdt-dataSz) for small data transmission.

If small data transmission using 4 step RACH is supported by the camped or serving cell on SUL: 4 step RACH configuration for SUL includes data size or data threshold or data volume threshold (i.e., signaled by gNB using parameter sdt-dataSz) for small data transmission. If small data transmission using 2 step RACH is supported by the camped or serving cell on SUL: 2 step RACH configuration for SUL includes data size or data threshold or data volume threshold (i.e., signaled by gNB using parameter sdt-dataSz) for small data transmission.

The operation to trigger small data transmission is as follows:

Step 1: UE first select the UL carrier (NUL or SUL)

if the camped or serving Cell is configured with supplementary uplink and if the RSRP of the downlink pathloss reference is less than rsrp-ThresholdSSB-SUL: UE select the SUL carrier. Otherwise, UE select the NUL carrier. rsrp-ThresholdSSB-SUL is signaled by gNB.

Step 2: UE select the UL BWP of selected UL carrier

In an embodiment, UL BWP is the initial UL BWP.

In another embodiment, UL BWP is the UL BWP indicated by gNB. The UL BWP can be indicated in connection release message sent by gNB. In another embodiment, UL BWP can be the active UL BWP at the time of RRC connection release. In another embodiment, UL BWP for small data transmission can be indicated by gNB in RRC reconfiguration message. In an embodiment, if UL BWP for small data transmission is indicated (e.g., in connection release or in reconfiguration message) by gNB, UE selects this BWP until the UE reselects to a new serving cell. Upon reselection, UE performs EDT on initial BWP. In another embodiment, if UL BWP for small data transmission is indicated (e.g., in connection release or in reconfiguration message) by gNB, UE selects this BWP until it changes its RAN area, Upon RAN area change UE performs EDT on initial BWP.

Step 3: UE then select the RACH Type if the selected UL BWP is configured with only 2 step RACH resources, UE selects 2 step RACH.

else if the selected UL BWP is configured with only 4 step RACH resources, UE selects 4 step RACH.

else if the selected UL BWP is configured with both 2 step and 4 step RACH resources:

if RSRP of the downlink pathloss reference is below a configured threshold, UE selects 4 step RACH. Otherwise, UE selects 2 step RACH.

Step 4:

If sdt-dataSz is configured and amount of uplink data to be transmitted is less than or equal to sdt-dataSz (or less than sdt-dataSz):

the UE may initiate random access procedure for small data transmission on selected UL carrier. Random access procedure is performed according to selected RACH type. If MsgA is transmitted during the random access procedure, uplink data is included in MsgA MAC PDU. If Msg3 is transmitted during the random access procedure, uplink data is included in Msg3 MAC PDU.

else the UE may initiate random access procedure for connection resume/establishment. Random access procedure is performed according to selected RACH type.

In an embodiment, parameter sdt-dataSz in above description is the parameter sdt-dataSz configured in RACH configuration of selected RACH type (step 3) in selected UL BWP (step 2) of selected UL carrier (step 1). In another embodiment, parameter sdt-dataSz in above description is the parameter sdt-dataSz configured in selected UL BWP (step 2). In another embodiment, parameter sdt-dataSz in above description is the parameter sdt-dataSz configured in selected UL carrier (step 1). 'Amount of data to be transmitted' is the total amount of data available (in bytes) of SDT DRB(s). The size of RLC headers and MAC headers are not included in computing amount of data available. So basically, the amount of data available is the number of PDCP PDUs multiplies by size of each PDCP PDU. In an embodiment, the size of RLC headers and/or MAC headers are also included in computing amount of data available.

Method 3:

In one embodiment of the disclosure, it is proposed that data size or data threshold or data volume threshold for small data transmission is configured separately for 2 step RACH on NUL, 2 step RACH on SUL, 4 step RACH on NUL and 4 step RACH on SUL.

If small data transmission using 4 step RACH is supported by the camped or serving cell on NUL: 4 step RACH configuration for NUL includes data size or data threshold or data volume threshold (i.e., signaled by gNB using parameter sdt-dataSz) for small data transmission. If small data transmission using 2 step RACH is supported by the camped or serving cell on NUL: 2 step RACH configuration for NUL includes data size or data threshold or data volume threshold (i.e., signaled by gNB using parameter sdt-dataSz) for small data transmission.

If small data transmission using 4 step RACH is supported by the camped or serving cell on SUL: 4 step RACH configuration for SUL includes data size or data threshold or data volume threshold (i.e., signaled by gNB using parameter sdt-dataSz) for small data transmission. If small data transmission using 2 step RACH is supported by the camped or serving cell on SUL: 2 step RACH configuration for SUL includes data size or data threshold or data volume threshold (i.e., signaled by gNB using parameter sdt-dataSz) for small data transmission.

In an embodiment, If SUL selection criteria are met and if 2 step RA selection criteria is met on SUL:

If parameter 'sdt-dataSz' is configured in 2 step RA configuration of SUL and amount of uplink data to be transmitted is less than or equal to sdt-dataSz and RSRP of the downlink pathloss reference is greater than or equal to a sdt-threshold where sdt-threshold is configured by gNB for small data transmission:

the UE may perform small data transmission using 2 step RA

UE initiate 2 step RA on SUL for small data transmission. Uplink data is transmitted in MsgA MAC PDU.

Else:

The UE may not perform small data transmission.

UE initiate 2 step RA on SUL for connection resume/establishment.

Uplink data is not transmitted in MsgA MAC PDU.

In an embodiment, if SUL selection criteria are met and if 2 step RA selection criteria is met on SUL:

If parameter 'sdt-dataSz' is configured in 2 step RA configuration of SUL and uplink data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 2 step RA

UE initiate 2 step RA on SUL for small data transmission.

Uplink data is transmitted in MsgA MAC PDU.

Else If parameter 'sdt-dataSz' is configured in 4 step RA configuration of SUL and uplink data to be transmitted is less than or equal to sdt-TBS (or less than sdt-dataSz) and RSRP of the downlink pathloss reference is greater than or equal to a sdt-threshold where sdt-threshold is configured by gNB for small data transmission:

the UE may perform small data transmission using 4 step RA

UE initiate 4 step RA on SUL for small data transmission.

Uplink data is transmitted in Msg3 MAC PDU.

Else:

the UE may not perform small data transmission.

UE initiate 2 step RA on SUL for connection resume/ establishment.

Uplink data is not transmitted in MsgA MAC PDU.

In an embodiment, if NUL selection criteria is met and If 2 step RA selection criteria is met on NUL:

If sdt-dataSz is configured in 2 step RA configuration of NUL and data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 2 step RA

UE initiate 2 step RA on NUL for small data transmission.

Uplink data is transmitted in MsgA MAC PDU.

Else:

the UE may not perform small data transmission.

UE initiate 2 step RA on NUL for connection resume/ establishment.

Uplink data is not transmitted in MsgA MAC PDU.

In an embodiment, if NUL selection criteria is met and If 2 step RA selection criteria is met on NUL:

If sdt-dataSz is configured in 2 step RA configuration of NUL and data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 2 step RA

UE initiate 2 step RA on NUL for small data transmission.

Uplink data is transmitted in MsgA MAC PDU.

Else If parameter 'sdt-dataSz' is configured in 4 step RA configuration of NUL and uplink data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 4 step RA

UE initiate 4 step RA on NUL for small data transmission.

Uplink data is transmitted in Msg3 MAC PDU.

Else:

the UE may not perform small data transmission.

UE initiate 2 step RA on NUL for connection resume/ establishment.

Uplink data is not transmitted in MsgA MAC PDU.

In an embodiment, if SUL selection criteria are met and if 4 step RA selection criteria is met on SUL:

If sdt-dataSz is configured in 4 step RA configuration of SUL and data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 4 step RA

UE initiate 4 step RA on SUL for small data transmission.

Uplink data is transmitted in Msg3 MAC PDU during 4 step RA.

Else:

the UE may not perform small data transmission.

UE initiate 4 step RA on SUL for connection resume/ establishment.

Uplink data is not transmitted in Msg3 MAC PDU.

In an embodiment, if NUL selection criteria is met and If 4 step RA selection criteria is met on NUL If sdt-dataSz is configured in 4 step RA configuration of NUL and data to be transmitted is less than or equal to sdt-dataSz (or less than sdt-dataSz) and RSRP of the downlink pathloss reference is greater than or equal to a sdt-threshold where sdt-threshold is configured by gNB for small data transmission:

the UE may perform small data transmission using 4 step RA

UE initiate 4 step RA on NUL for small data transmission.

Uplink data is transmitted in Msg3 MAC PDU during 4 step RA.

Else:

Do not perform small data transmission.

UE initiate 4 step RA on NUL for connection resume/ establishment.

Uplink data is not transmitted in Msg3 MAC PDU.

In the above description criteria for SUL/NUL selection is as follows:

if the camped or serving Cell is configured with supplementary uplink and if the RSRP of the downlink pathloss reference is less than rsrp-ThresholdSSB-SUL: UE select the SUL carrier. Otherwise, UE select the NUL carrier. rsrp-ThresholdSSB-SUL is signaled by gNB.

In the above description criteria for 4 step RA/2 step RA selection is as follows:

if the UL BWP is configured with only 2 step RACH resources, UE selects 2 step RACH.

else if the UL BWP is configured with only 4 step RACH resources, UE selects 4 step RACH.

else if the UL BWP is configured with both 2 step and 4 step RACH resources:

if RSRP of the downlink pathloss reference is below a configured threshold, UE selects 4 step RACH. Otherwise, UE selects 2 step RACH.

In the above description, RACH configuration refers to RACH configuration of UL BWP which is selected for Random access procedure. For small data transmission in inactive state, RACH configuration refers to RACH configuration of initial UL BWP or 'UL BWP indicated (indication can be in connection release or in RRC reconfiguration message) by gNB for small data transmission', of selected UL carrier. 'Amount of data to be transmitted' is the total amount of data available (in bytes) of SDT DRB(s). The size of RLC headers and MAC headers are not included in computing amount of data available. So basically, the amount of data available is the number of PDCP PDUs multiplies by size of each PDCP PDU. In an embodiment, the size of RLC headers and/or MAC headers are also included in computing amount of data available.

Method 4:

In one embodiment of the disclosure, it is proposed that data size or data threshold or data volume threshold for small data transmission is configured separately for 2 step RACH on NUL, 2 step RACH on SUL, 4 step RACH on NUL and 4 step RACH on SUL.

If small data transmission using 4 step RACH is supported by the camped or serving cell on NUL: 4 step RACH configuration for NUL includes data size or data threshold or data volume threshold (i.e., signaled by gNB using parameter sdt-dataSz) for small data transmission. If small data transmission using 2 step RACH is supported by the camped or serving cell on NUL: 2 step RACH configuration for NUL includes data size or data threshold or data volume threshold (i.e., signaled by gNB using parameter sdt-dataSz) for small data transmission.

If small data transmission using 4 step RACH is supported by the camped or serving cell on SUL: 4 step RACH configuration for SUL includes data size or data threshold or data volume threshold (i.e., signaled by gNB using parameter sdt-dataSz) for small data transmission. If small data transmission using 2 step RACH is supported by the camped or serving cell on SUL: 2 step RACH configuration for NUL includes data size or data threshold or data volume threshold (i.e., signaled by gNB using parameter sdt-dataSz) for small data transmission.

The operation to trigger small data transmission is as follows:

Step 1: UE first select the UL carrier (NUL or SUL)

if the camped or serving Cell is configured with supplementary uplink and if the RSRP of the downlink pathloss reference is less than rsrp-ThresholdSSB-SUL: UE select the SUL carrier. Otherwise, UE select the NUL carrier. rsrp-ThresholdSSB-SUL is signaled by gNB.

Step 2: UE select the UL BWP of selected UL carrier

In an embodiment, UL BWP is the initial UL BWP.

In another embodiment, UL BWP is the UL BWP indicated by gNB. The UL BWP can be indicated in connection release message sent by gNB. In another embodiment, UL BWP can be the active UL BWP at the time of RRC connection release. In another embodiment, UL BWP for small data transmission can be indicated by gNB in RRC reconfiguration message. In an embodiment, if UL BWP for small data transmission is indicated (e.g., in connection release or in reconfiguration message) by gNB, UE selects this BWP until the UE reselects to a new serving cell. Upon reselection, UE performs EDT on initial BWP. In another embodiment, if UL BWP for small data transmission is indicated (e.g., in connection release or in reconfiguration message) by gNB, UE selects this BWP until it changes its RAN area, Upon RAN area change UE performs EDT on initial BWP.

Step 3: UE then select the RACH Type if the selected UL BWP is configured with only 2 step RACH resources, UE selects 2 step RACH.

else if the selected UL BWP is configured with only 4 step RACH resources, UE selects 4 step RACH.

else if the selected UL BWP is configured with both 2 step and 4 step RACH resources:

if RSRP of the downlink pathloss reference is below a configured threshold, UE selects 4 step RACH. Otherwise, UE selects 2 step RACH.

Step 4:

If sdt-dataSz is configured and amount of data to be transmitted is less than or equal to sdt-dataSz and RSRP of the downlink pathloss reference is greater than or equal to a sdt-threshold where sdt-threshold is configured by gNB for small data transmission:

initiate random access procedure for small data transmission (i.e., UE transmit uplink data during the random access procedure) on selected UL carrier. Random access procedure is performed according to selected RACH type. If MsgA is transmitted during the random access procedure, uplink data is included in MsgA MAC PDU. If Msg3 is transmitted during the random access procedure, uplink data is included in Msg3 MAC PDU.

else initiate random access procedure for connection resume/establishment (i.e., UE do not perform small data transmission during the random access procedure). Random access procedure is performed according to selected RACH type.

In an embodiment, parameter sdt-dataSz in above description (i.e., step 4) is the parameter sdt-dataSz configured in RACH configuration of selected RACH type (step 3) in selected UL BWP (step 2) of selected UL carrier (step 1). In another embodiment, parameter sdt-dataSz in above description is the parameter sdt-dataSz configured in selected UL BWP (step 2). In another embodiment, parameter sdt-dataSz in above description is the parameter sdt-dataSz configured in selected UL carrier (step 1). In an embodiment, parameter sdt-threshold in above description (i.e., step 4) is the parameter sdt-threshold configured in RACH configuration of selected RACH type (step 3) in selected UL BWP (step 2) of selected UL carrier (step 1). In another embodiment, parameter sdt-threshold in above description is the parameter sdt-threshold configured in selected UL BWP (step 2). In another embodiment, parameter sdt-threshold in above description is the parameter sdt-threshold configured in selected UL carrier (step 1).

'Amount of data to be transmitted' is the total amount of data available (in bytes) of SDT DRB(s). The size of RLC headers and MAC headers are not included in computing amount of data available. So basically, the amount of data available is the number of PDCP PDUs multiplies by size of each PDCP PDU. In an embodiment, the size of RLC headers and/or MAC headers are also included in computing amount of data available.

According to an embodiment of the disclosure, a method performed by a terminal in a wireless communication system is disclosed. The method may comprise: receiving, from a base station, random access channel (RACH) configuration message comprising information for one or more data sizes each of which is associated with a RACH type and an uplink (UL) carrier type; identifying, among the one or more data sizes, a data size associated with a UL carrier and RACH type determined by the terminal, based on the configuration message; and performing an early data transmission (EDT) based on the identified data size and UL data size.

In an embodiment, the performing of the EDT may comprise: in case that the UL data size is less than or equal to the identified data size, performing the EDT.

In an embodiment, the one or more data sizes may comprise: a first data size corresponding to a first RACH type on a first UL carrier; a second data size corresponding to the first RACH on a second UL carrier; a third data size corresponding to a second RACH on the first UL carrier; and a fourth data size corresponding to the second RACH on the second UL carrier.

In an embodiment, the first RACH type may comprise 4 step RACH type, wherein the second RACH type comprises 2 step RACH type, wherein the first UL carrier comprises a normal UL carrier, and wherein the second UL carrier comprises a supplementary UL carrier.

In an embodiment, the identifying of the data size may comprise: determining the UL carrier; and determining a UL bandwidth part (BWP) of the selected UL carrier; and determining the RACH type based on the determined UL BWP.

Figure 9:
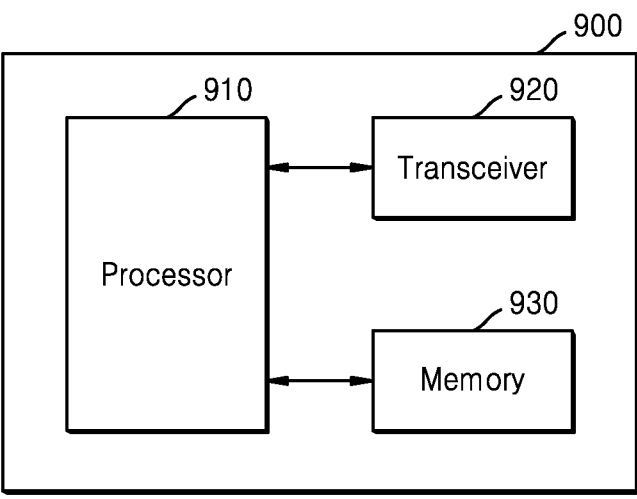
FIG. 9 is a diagram illustrating a UE according to an embodiment of the present disclosure.

FIG. 9 is a diagram illustrating a UE 900 according to an embodiment of the present disclosure.

Referring to the FIG. 9, the UE 900 may include a processor 910, a transceiver 920 and a memory 930. However, all of the illustrated components are not essential. The UE 900 may be implemented by more or less components than those illustrated in the FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the UE 900 may be implemented by the processor 910.

The transceiver 920 may be connected to the processor 910 and transmit and/or receive a signal. In addition, the transceiver 920 may receive the signal through a wireless channel and output the signal to the processor 910. The transceiver 920 may transmit the signal output from the processor 910 through the wireless channel.

The processor 910 may receive, from a source node via the transceiver 920, a handover command comprising mode information associated with one or more scheduling modes in a target node. The handover command may further comprise exceptional resource pool information associated with an exceptional resource pool configuration. The handover command may further comprise configured grant (CG) type information associated with a CG Type 1 SL grant configuration for the one or more SL LCHs. Specifically, one or more scheduling modes may comprise a first scheduling mode associated with a scheduled resource allocation and a second scheduling mode associated with an autonomous resource allocation.

The processor 910 may determine, among the one or more scheduling modes, a scheduling mode associated with the one or more sidelink logical channels (SL LCHs), based on the handover command. In an embodiment, in case that a first SL LCH is associated with the CG Type 1 SL grant, the processor 910 may determine a scheduling mode of the first SL LCH as the first scheduling mode.

In an embodiment, in case that a second SL LCH is associated with the first scheduling mode, the second SL LCH is unmapped to the CG Type 1 SL grant and the exceptional resource pool is configured, the processor 910 may determine a scheduling mode of the second SL LCH as the second scheduling mode.

In an embodiment, in case that a third SL LCH is associated with the first scheduling mode, the third SL LCH is unmapped to the CG Type 1 SL grant and the exceptional resource pool is not configured, the processor 910 may determine a scheduling mode of the third SL LCH as the first scheduling mode.

In an embodiment, in case that a fourth SL LCH is associated with the second scheduling mode and the exceptional resource pool is configured, the processor 910 may determine a scheduling mode of the fourth SL grant as the second scheduling mode.

In an embodiment, in case that a fifth SL LCH is associated with the second scheduling mode and the exceptional resource pool is not configured, the processor may determine a scheduling mode of the fifth SL LCH as the first scheduling mode.

The processor 910 may transmit, to the target node via the transceiver 920, data from the one or more SL LCHs based on the determined scheduling mode. In an embodiment, the processor 910 may transmit to the target node via the transceiver 920, first data from the first SL LCH based on the first scheduling mode and the CG Type 1 SL grant, until a handover is completed. For example, after completion of the handover, a dynamic grant and the CG Type 1 SL grant are used for transmission of the first data.

In an embodiment, the processor 910 may transmit, to the target node via the transceiver 920, second data from the second SL LCH based on the second scheduling mode and the exceptional resource pool, until a handover is completed. The first scheduling mode may be applied after completion of the handover. A dynamic grant and a CG Type 2 SL grant may be used after the completion of the handover for transmission of the second data in case that the second SL LCH is associated with the CG Type 2 SL grant.

In an embodiment, the processor 910 may transmit, to the target node via the transceiver 920, third data from the third SL LCH based on the first scheduling mode and the CG Type 1 SL grant, until a handover is completed. After completion of the handover, dynamic grant and a CG Type 2 SL grant may be used for transmission of the third data.

In an embodiment, the processor 910 may transmit, to the target node via the transceiver 920, fourth data from the fourth SL LCH based on the second scheduling mode and the exceptional resource pool, until sensing results are available. A normal resource pool may be used after the sensing results are available for transmission of the fourth data.

In an embodiment, the processor 910 may transmit, to the target node via the transceiver 920, fifth data from the fifth SL LCH based on the first scheduling mode and the CG Type 1 SL grant, until sensing results are available. After the sensing results are available, the processor 910 may apply the second scheduling mode and use the normal resource pool for transmission of the fifth data.

The memory 930 may store the control information or the data included in a signal obtained by the UE 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Figure 10:
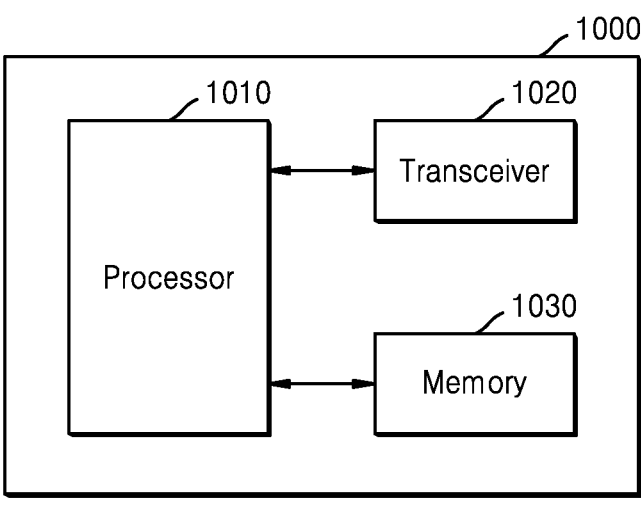
FIG. 10 is a diagram illustrating a base station according to an embodiment of the present disclosure.

FIG. 10 is a diagram illustrating a base station 1000 according to an embodiment of the present disclosure.

Referring to the FIG. 10, the base station 1000 may include a processor 110, a transceiver 1020 and a memory 1030. However, all of the illustrated components are not essential. The base station 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the base station 1000 may be implemented by the processor 1010.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The processor 1010 may transmit, to a terminal via the transceiver 1020, a handover command comprising mode information associated with one or more scheduling modes in a target node. The handover command may further comprises: exceptional resource pool information associated with an exceptional resource pool configuration; and configured grant (CG) type information associated with a CG Type 1 SL grant configuration for the one or more SL LCHs. A scheduling mode associated with the one or more SL LCHs, among the one or more scheduling modes, may be determined by the terminal based on the handover command.

The processor 1010 may receive, from the terminal via the transceiver 1020, data from the one or more SL LCHs, based on the determined scheduling mode.

The memory 1030 may store the control information or the data included in a signal obtained by the base station 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a configuration comprising a data volume threshold for a small data transmission (SDT) and a first reference signal received power (RSRP) threshold for the SDT;
   determining whether conditions for the SDT are fulfilled, based on the configuration, wherein the conditions include a first condition that a data volume of uplink data for the SDT is less than or equal to the data volume threshold, and a second condition that an RSRP of a downlink pathloss reference is greater than the first RSRP threshold; and
   based on determining that the conditions are fulfilled, performing the SDT on an uplink carrier according to a random access (RA) procedure.

2. The method of claim 1, further comprising:
   selecting a normal uplink (NUL) carrier or a supplementary uplink (SUL) carrier as the uplink carrier, based on a second RSRP threshold for selection between the SUL carrier and the NUL carrier.

3. The method of claim 2, wherein the SUL carrier is selected as the uplink carrier based on the RSRP of the downlink pathloss reference being less than the second RSRP threshold, and
   wherein the NUL carrier is selected as the uplink carrier based on the RSRP of the downlink pathloss reference being greater than or equal to the second RSRP threshold.

4. The method of claim 1, further comprising:
   determining a bandwidth part (BWP) for the RA procedure; and
   determining an RA type for the RA procedure, based on the BWP for the RA procedure.

5. The method of claim 4, wherein:
   in case that the BWP is only configured with 2 step RA type random access resources, the RA type is determined as 2 step RA type, and
   in case that the BWP is configured with both 2 step and 4 step RA type random access resources, the RA type is determined as 2 step RA type or 4 step RA type based on a comparison between the RSRP of the downlink pathloss reference and a third RSRP threshold for selection between the 2 step RA type and the 4 step RA type.

6. The method of claim 4, wherein the determined BWP is an initial BWP.

7. The method of claim 1, wherein the SDT is performed in inactive state.

8. A terminal in a wireless communication system, the terminal comprising:

at least one transceiver;

at least one processor communicatively coupled to the at least one transceiver; and at least one memory, communicatively coupled to the at least one processor, storing instructions executable by the at least one processor to cause the terminal to:

receive, from a base station, a configuration comprising a data volume threshold for a small data transmission (SDT) and a first reference signal received power (RSRP) threshold for the SDT, determine whether conditions for the SDT are fulfilled, based on the configuration, wherein the conditions include a first condition that a data volume of uplink data for the SDT is less than or equal to the data volume threshold, and a second condition that an RSRP of a downlink pathloss reference is greater than the first RSRP threshold, and based on determining that the conditions are fulfilled, perform the SDT on an uplink carrier according to a random access (RA) procedure.

9. The terminal of claim 8, wherein the terminal is further caused to:

select a normal uplink (NUL) carrier or a supplementary uplink (SUL) carrier as the uplink carrier, based on a second RSRP threshold for selection between the SUL carrier and the NUL carrier.

10. The terminal of claim 9, wherein the SUL carrier is selected as the uplink carrier based on the RSRP of the downlink pathloss reference being less than the second RSRP threshold, and wherein the NUL carrier is selected as the uplink carrier based on the RSRP of the downlink pathloss reference being greater than or equal to the second RSRP threshold.

11. The terminal of claim 8, wherein the terminal is further caused to:

determine a bandwidth part (BWP) for the RA procedure; and determine an RA type for the RA procedure, based on the BWP for the RA procedure.

12. The terminal of claim 11, wherein:

in case that the BWP is only configured with 2 step RA type random access resources, the RA type is determined as 2 step RA type, and in case that the BWP is configured with both 2 step and 4 step RA type random access resources, the RA type is determined as 2 step RA type or 4 step RA type based on a comparison between the RSRP of the downlink pathloss reference and a third RSRP threshold for selection between the 2 step RA type and the 4 step RA type.

13. The terminal of claim 11, wherein the determined BWP is an initial BWP.

14. The terminal of claim 8, wherein the SDT is performed in inactive state.

15. One or more non-transitory computer-readable storage media storing computer-executable instructions, when executed by at least one processor of a terminal, cause the terminal to perform operations, the operations comprising:

receiving, from a base station, a configuration comprising a data volume threshold for a small data transmission (SDT) and a first reference signal received power (RSRP) threshold for the SDT;

determining whether conditions for the SDT are fulfilled, based on the configuration, wherein the conditions include a first condition that a data volume of uplink data for the SDT is less than or equal to the data volume threshold, and a second condition that an RSRP of a downlink pathloss reference is greater than the first RSRP threshold; and based on determining that the conditions are fulfilled, performing the SDT on an uplink carrier according to a random access (RA) procedure.

* * * * *